(12) United States Patent
Konda et al.

(10) Patent No.: US 12,206,690 B2
(45) Date of Patent: Jan. 21, 2025

(54) METHODS, SYSTEMS, ARTICLES OF MANUFACTURE AND APPARATUS TO REDUCE COMPUTATION CORRESPONDING TO INSPECTION OF NON-MALICIOUS DATA FLOWS

(71) Applicant: McAfee, LLC, San Jose, CA (US)

(72) Inventors: Tirumaleswar Reddy Konda, Bangalore (IN); Himanshu Srivastava, Bangalore (IN); Shashank Jain, Bangalore (IN)

(73) Assignee: McAfee, LLC, San Jose, CA (US)

( * ) Notice: Subject to any disclaimer, the term of this patent is extended or adjusted under 35 U.S.C. 154(b) by 274 days.

(21) Appl. No.: 17/482,799

(22) Filed: Sep. 23, 2021

(65) Prior Publication Data

US 2023/0093904 A1    Mar. 30, 2023

(51) Int. Cl.
*H04L 9/40*    (2022.01)

(52) U.S. Cl.
CPC ...... *H04L 63/1425* (2013.01); *H04L 63/0236* (2013.01); *H04L 63/0272* (2013.01); *H04L 63/029* (2013.01); *H04L 63/1433* (2013.01)

(58) Field of Classification Search
CPC ............. H04L 63/1425; H04L 63/0236; H04L 63/0272; H04L 63/1433
USPC ........................................................ 726/31
See application file for complete search history.

(56) References Cited

U.S. PATENT DOCUMENTS

| | | |
|---|---|---|
| 9,106,661 B1 | 8/2015 | Stamos |
| 9,923,923 B1 | 3/2018 | Mehr et al. |
| 10,291,584 B2 * | 5/2019 | Koripella ............ H04L 47/2433 |
| 10,623,284 B2 * | 4/2020 | Yadav ................ G06F 9/45558 |
| 11,245,685 B2 | 2/2022 | Konda et al. |
| 2004/0098588 A1 | 5/2004 | Ohba et al. |
| 2008/0046717 A1 | 2/2008 | Kanekar et al. |

(Continued)

FOREIGN PATENT DOCUMENTS

| | | | | |
|---|---|---|---|---|
| EP | 3935781 A1 * | 1/2022 | ......... | H04L 63/0245 |
| KR | 20160005113 | 1/2016 | | |

OTHER PUBLICATIONS

Dynamic Attribute-based Reputation scoring for Malicious IP Address Detection NPL (Year: 2018).*

(Continued)

*Primary Examiner* — Shin-Hon (Eric) Chen
*Assistant Examiner* — Saad Ahmad Abdullah
(74) *Attorney, Agent, or Firm* — Hanley, Flight & Zimmerman, LLC

(57) ABSTRACT

Methods, apparatus, systems, and articles of manufacture are disclosed to improve the inspection of network data flows. An example apparatus includes memory, and processor circuitry to execute machine readable instructions to at least identify network domains accessible by at least one client device in a geographic location of interest, associate the identified network domains with Autonomous System Numbers (ASNs), create a list of respective ones of the ASNs that include a non-malicious status corresponding to Internet protocol (IP) addresses associated with respective ones of the identified network domains, and in response to receiving a reputation request corresponding to a destination IP address, cause inspection of a data flow to be skipped when the destination IP address is associated with the list of non-malicious ASNs.

20 Claims, 12 Drawing Sheets

(56) References Cited

U.S. PATENT DOCUMENTS

| | | | |
|---|---|---|---|
| 2008/0126794 | A1 | 5/2008 | Wang et al. |
| 2010/0199099 | A1 | 8/2010 | Wu |
| 2010/0299525 | A1 | 11/2010 | Shah et al. |
| 2011/0154026 | A1 | 6/2011 | Edstrom et al. |
| 2011/0219114 | A1* | 9/2011 | Yang .................. H04L 61/4535 709/224 |
| 2014/0259140 | A1* | 9/2014 | Subramanian ...... H04L 63/1408 726/11 |
| 2016/0080328 | A1 | 3/2016 | Bollay et al. |
| 2019/0058714 | A1 | 2/2019 | Joshi et al. |
| 2019/0074982 | A1 | 3/2019 | Hughes |
| 2019/0173863 | A1 | 6/2019 | Chen et al. |
| 2019/0387005 | A1* | 12/2019 | Zawoad .............. H04L 61/4511 |
| 2021/0051160 | A9* | 2/2021 | Abu-Nimeh ........ H04L 63/1433 |
| 2021/0075671 | A1* | 3/2021 | Li ....................... H04W 12/033 |

OTHER PUBLICATIONS

American Registry for Internet Numbers, "Autonomous Systems Numbers," retrieved from https://www.arin.net/resources/guide/asn/, 2 pages.

Google Cloud, "Configuring Private Google Access for on-premises hosts," retrieved from https://cloud.google.com/vpc/docs/configure-private-google-access-hybrid, last updated Dec. 20, 2021, 10 pages.

Microsoft Docs, "Microsoft 365 and Office 365 URLs and IP address Ranges," retrieved from https://docs.microsoft.com/en-us/microsoftteams/office-365-urls-ip-address-ranges, Aug. 26, 2021, 2 pages.

"Internet Engineering Task Force, Client Subnet in DNS Queries," retrieved from https://datatracker.ietf.org/doc/html/rfc7871, May 2016, 30 pages.

International Searching Authority, "Written Opinion," issued in connection with International Patent Application No. PCT/US2019/068837, dated Apr. 29, 2020, 5 pages.

International Searching Authority, "Search Report," issued in connection with International Patent Application No. PCT/US2019/068837, dated Apr. 29, 2020, 4 pages.

Fischlin et al., "Replay Attacks on Zero Round-Trip Time: The Case of the TLS 1.3 Handshake Candidates," [https://eprint.iacr.org/2017/082.pdf], 2nd IEEE European Symposium on Security and Privacy (S&P 2017), Feb. 2, 2017, pp.60-75, retrieved on May 10, 2019, 50 pages.

Breedijk, "TLS Renegotiation Attack. More Bad News fro SSL," [https://stories.schubergphilis.com/tls-renegotiation-attack-more-bad-news], Nov. 8, 2009, retrieved on Nov. 11, 2018, 4 pages.

Anderson et al., "Deciphering Malware's Use of TLS (without Decryption)," [https://arxiv.org/pdf/1607.01639], arXiv:1607.01639v1, Jul. 6, 2016, 15 pages.

Mozilla Security Blog, "Distrust of Symantec TLS Certificates," [https://blog.mozilla.org/security/2018/03/12/distrust-symantec-tls-certificates/], Mar. 12, 2018, Accessed via [https://web.archive.org/web/20180313053149/https://blog.mozilla.org/security/2018/03/12/distrust-symantec-tls-certificates/] on Aug. 23, 2019, 3 pages.

Speccy, "Fast, lightweight, advances system information tool for your PC," [https://www.ccleaner.com/speecy], 5 pages. Jan. 25, 2018, Accessed via [https://web.archive.org/web20180125015519/https://www.ccleaner.com/speecy] on Aug. 23, 2019, 6 pages.

Brandom, "Hackers emptied Ethereum wallets by breaking the basic infrastructure of the internet," [https://www.theverge.com/2018/4/24/17275982/myetherwallet-hack-bgp-dns-hijacking-stolen-ethereum], Apr. 24, 2018, 3 pages.

Sheffer et al., "Recommendations for Secure Use of Transport Layer Security (TLS) and Datagram Transport Layer Security (DTLS)," [https://tools.ietf.org/html/rfc7525], Internet Engineering Task Force, May 2015, 27 pages.

Rescorla, "The Transport Layer Security (TLS) Protocol Version 1.3," [https://tools.ietf.org/html/rfc8446], Internet Engineering Task Force, Aug. 2018, 160 pages.

Leyden, "Samsung smart fridge leaves Gmail logins open to attack," [https://www.theregister.co.uk/2015/08/24/smart_fridge_security_fuber/], Aug. 24, 2015, 6 pages.

Brumaghin et al., CCleanup: A Vast Number of Machines at Risk, [https://blog.talosintelligence.com/2017/09/avast-distributes-malware.html], Sep. 18, 2017, 23 pages.

O'Neill, "Trustico revokes 23,000 SSL certificated due to compromise," [https://www.cyberscoop.com/trustico-digicert-ssl-certificates-revoked/], Feb. 28, 2018, 6 pages.

United States Patent and Trademark Office, "Non-Final Office Action," issued Mar. 8, 2021 in connection with U.S. Appl. No. 16/296,199, 13 pages.

United States Patent and Trademark Office, "Final Office Action," issued Jul. 19, 2021 in connection with U.S. Appl. No. 16/296,199, 13 pages.

United States Patent and Trademark Office, "Advisory Action," issued Sep. 24, 2021 in connection with U.S. Appl. No. 16/296,199, 2 pages.

United States Patent and Trademark Office, "Non-Final Office Action," issued Nov. 11, 2021 in connection with U.S. Appl. No. 16/296,199, 8 pages.

\* cited by examiner

METHODS, SYSTEMS, ARTICLES OF MANUFACTURE AND APPARATUS TO REDUCE COMPUTATION CORRESPONDING TO INSPECTION OF NON-MALICIOUS DATA FLOWS

FIELD OF THE DISCLOSURE

This disclosure relates generally to the inspection of data flows on computer networks, and more particularly, to methods, systems, articles of manufacture, and apparatus to reduce computation corresponding to inspection of non-malicious data flows.

BACKGROUND

Network traffic between a client device and a server is typically inspected by a network traffic monitor (e.g., a middle-box) to ensure that the data a user is transmitting/receiving is safe and not at risk of being seen by hackers. Network security protocols have been implemented to encrypt data and authenticate connections between client and server. Recently, updates have been made to such protocols to improve the privacy and security of data flows traveling across a network.

Figure 1:
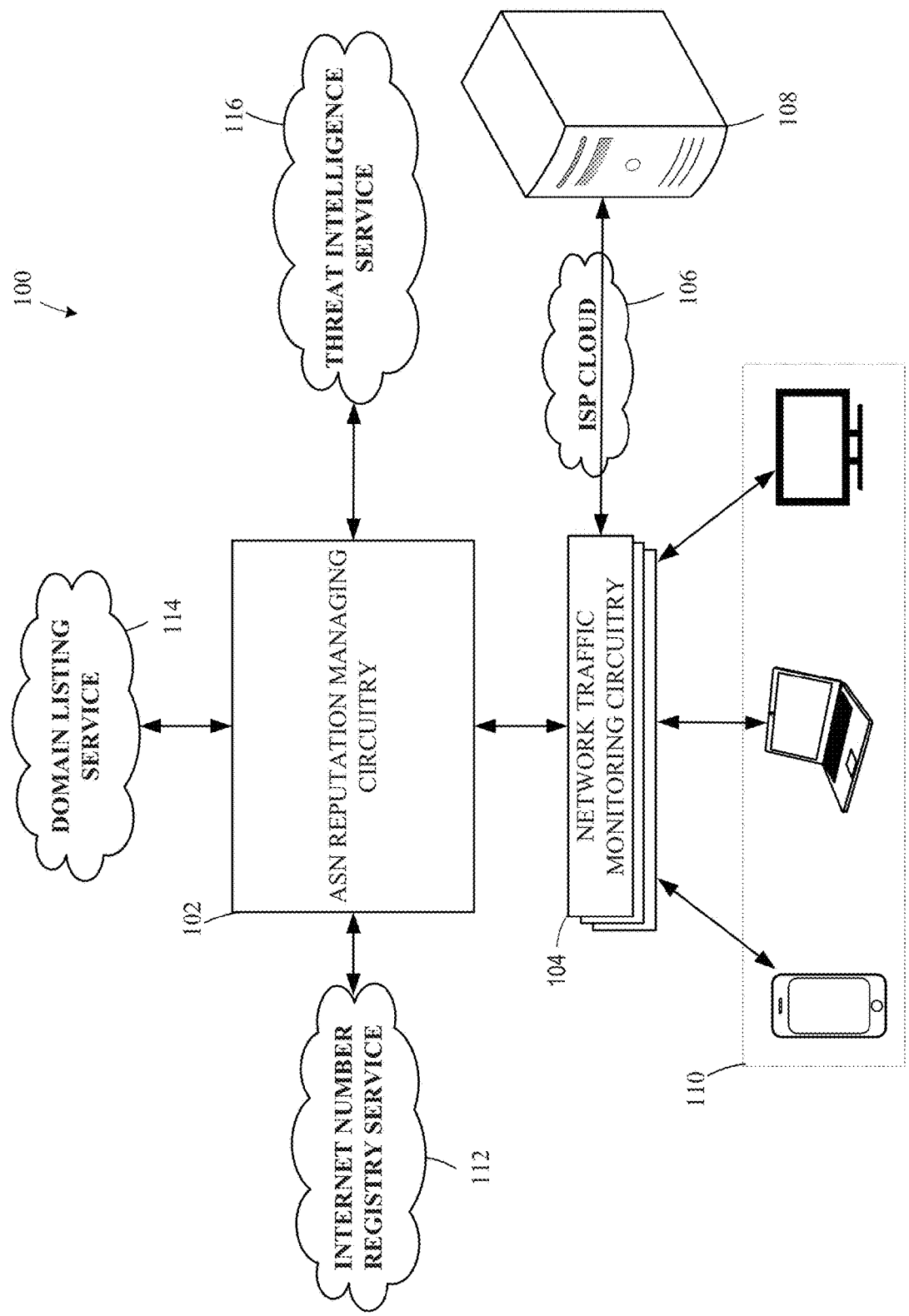
FIG. 1 is a is a block diagram illustrating an example environment including a system to reduce the computational effort corresponding to inspection of non-malicious data flows constructed in accordance with the teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Network traffic has seen a growing need for more complex security and privacy standards. If not properly secured, some network communications containing private information such as passwords, financial information, etc., can be observed by a third party. Other instances of security danger can occur in which a user will connect to a network destination (e.g., a network domain) that has falsified network credentials. The malicious domain can then infect the user's device with malware, allowing for the device to be controlled and/or otherwise accessed by an attacker. In efforts to keep network data secure, cryptographic protocols such as the Secure Sockets Layer (SSL) protocol, the Transport Layer Security (TLS) protocol, and others have been developed to encrypt data as well as ensure safe connections between devices (e.g., a user device) and any number of network destinations.

The TLS protocol works as a mediator between two entities trying to communicate over a network. Initial "handshake" messages are exchanged between the two entities to acknowledge communication requests, authenticate the network identities of the entities, and determine various communication guidelines (e.g., TLS version number, cryptography keys, etc.). If at any point during the TLS handshake sequence there are discrepancies in the messages being exchanged, an example TLS implementation will prevent the device (e.g., a user device) from any actions that will leave it exposed to security threats (e.g., the device (e.g., the user device) will be redirected to a block page, etc.). After the handshake is performed, the two entities (e.g., a user device and a server) go about communicating with the agreed upon guidelines from previous messages. Recently the TLS protocol was updated to improve upon previous versions and provide safer client-server connection. At the time of this writing, this most recent version (TLS version 1.3), brought about some key changes to the protocol such as the cryptographic algorithms used, the introduction of new modes, encrypting handshake messages after the initial response from a server, etc. Since its release, TLS 1.3 has become widely accepted and is used to encrypt and authenticate secure connection for most data moving over the Internet.

Previous versions of TLS (e.g., 1.1 and 1.2) allowed for the introductory messages of the handshake between the client and server (e.g., ClientHello and/or ServerHello) to be sniffed, inspected, and/or otherwise observed. As another layer of protection, consumer home and enterprise computer security solutions inspect TLS handshakes performed on network traffic monitors. When client devices request access to information from a server, these inspection solutions try to identify malicious data flows, malwares falsifying Server Name Indication (SNI), protect against poor implementations of the TLS protocol, enforce TLS based firewall rules, etc. Due to the recent update to TLS 1.3 many of the TLS inspection techniques have become obsolete and new security solutions have been developed to inspect TLS 1.3 implementations.

In some current inspection techniques for the TLS 1.3 protocol, a network traffic monitor can be configured to act as a full proxy capable of inspecting the encrypted messages sent after the client introductory message. This technique requires a great deal of computational overhead due to the monitoring, decrypting, and encrypting of all traffic flows. In addition to the increased overhead caused by inspecting flows, to act as a full proxy, monitors are also required to download and install a security certificate for each of the client devices in use. Some enterprise systems with extensive computing capability can handle this overhead and are trusted for certificate installation on client devices, however other enterprise systems and/or less advanced home systems are typically not equipped to handle such workloads. Partial proxy implementations have been developed to bypass the need for certificate installation and thus reduce the computational loads on traffic monitors. However, there is a need for an optimization that will allow for network traffic monitors to know when partial inspections need to be triggered.

Examples disclosed herein reduce the computational load on traffic monitoring devices implementing inspection security solutions by, in part, determining if inspection of a given data flow can be skipped and/or otherwise prevented. In some examples, data flows are linked to reputable destination Internet Protocol (IP) addresses and, thus, inspection of these flows are unnecessary. Current example implementations to skip the inspection of data flows access lists of acceptable IP addresses and skip inspection if the destination IP address is part of an approved list. However, such lists are limited to a few well-known services (e.g., Microsoft Office365, Google Services, etc.).

In examples disclosed herein, to address constraints set by approved lists of IP addresses, a greenlist of approved Autonomous System Numbers (ASNs) is generated based on the reputations of IP addresses associated with the ASN. As used herein, Autonomous Systems (AS) are groupings of IP addresses controlled and/or otherwise managed by a single administrator (e.g., Amazon, Verizon, etc.) (e.g., with a particular routing policy). Each of these groupings receives or is otherwise associated with a number (i.e., an ASN) from an Internet numbering authority (e.g., Internet Assigned Number Authority (IANA)). Because each administrator or network operator can establish a particular policy, each ASN is geographically unique with regard to how it should be treated and/or otherwise trusted. Stated differently, if some ASNs (and their associated IP addresses) are associated with an administrator with a relatively lenient policy, then a relatively greater risk may be associated with those IP addresses of a corresponding ASN. Domain reputations (e.g., whether a domain is classified as malicious, linked to phishing, etc.) can be readily accessed through a threat intelligence service (e.g., McAfee's Global Threat Intelligence, other third-party reputation services, etc.) and applied to (e.g., associated with) IP addresses affiliated with a domain. Access to these domain reputations allows for a status of an ASN to be designated as malicious, non-malicious, or unknown based on the percentage of IP addresses, linked to the ASN, having acceptable domain reputations. When data flows are observed, the corresponding destination IP address is used to determine the corresponding ASN. This ASN is compared with the greenlist to determine if inspection can be skipped.

In examples disclosed herein, inspection of data flows will still need to be completed for communications with destination IP addresses belonging to an ASN with a status designated as malicious or unknown. After inspection is complete, if the connection is found to be non-malicious, example devices can save elements of the handshake messages occurring between client and server such as Server-Hello size, TLS version number, cipher suites, compression techniques, etc. and use them during future/subsequent communication attempts to skip inspection for data flows going to the same destination IP address. In examples disclosed herein, the ability to skip such flows occurs during the lifespan of the initial communication on the network, otherwise known as the Time-to-Live value (TTL). Examples disclosed herein utilize a secondary list, herein referred to as a TTL greenlist, to further improve and reduce overall computing overhead as data flows from clients across home and enterprise deployments. As such, data flows directed to the temporarily approved IP address, can be skipped.

Other techniques of providing privacy and security for clients include the usage of a virtual private network (VPN). VPNs are used to allow for devices (e.g., user devices) to send and receive data over shared or public networks as if it were a private network through the use of tunneling (e.g., repacking traffic data into a different form). Tunneling users' data places a great deal of computational burden on a VPN client and VPN server to encapsulate and encrypt data packets being sent/received. This can be especially taxing with high-bandwidth applications such as video streaming, voice over IP (VOIP), etc. In disclosed examples, the number of domains sharing an IP address, herein known as the sharing ratio, for each IP address in a given AS is calculated. The sharing ratio can be used to determine if given flows need to be tunneled using the VPN or can be sent across the public network without the use of VPN resources. Relatively large sharing ratio values indicate that the destination IP address hosts many domains/services. If an eavesdropper (e.g., a security hacker) was to observe the communications going to an IP address with a relatively large sharing ratio, then it would be difficult for the eavesdropper to know exactly which service is being used, thus protecting the information sent. Using this technique, the example devices decrease the computational overhead associated with tunneling connections when using a VPN.

FIG. 1 is a block diagram illustrating an example environment 100 in which client devices 110 communicate with a server 108 via a network (e.g., the Internet) delivered by an internet service provider (ISP) cloud 106 and the communications are inspected by example network traffic monitoring circuitry 104. Further included in the example environment 100 and connected to the example network traffic monitoring circuitry 104 is example ASN reputation managing circuitry 102 with communication links to an internet number registry service 112, a domain listing service 114, and a threat intelligence service 116.

Figure 2:
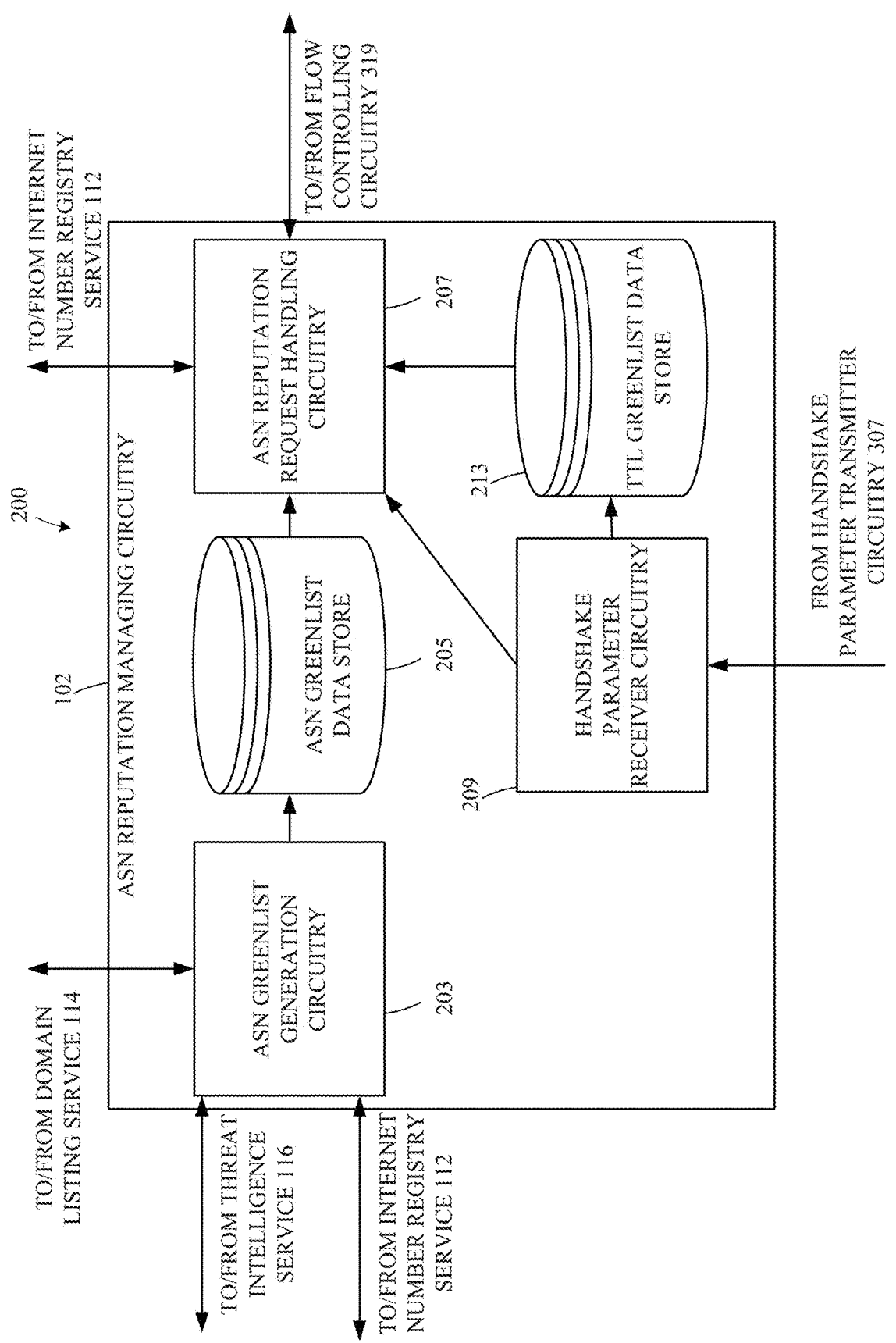
FIG. 2 is a block diagram of an example implementation of the Autonomous System Number (ASN) reputation managing circuitry shown in FIG. 1.

FIG. 2 is a block diagram 200 providing additional detail for the example ASN reputation managing circuitry 102 illustrated in FIG. 1. The example ASN reputation managing circuitry 102 includes example ASN greenlist generation circuitry 203, example ASN greenlist data store 205, example ASN reputation request handling circuitry 207, example handshake parameter receiver circuitry 209, and example TTL greenlist data store 213.

Figure 3:
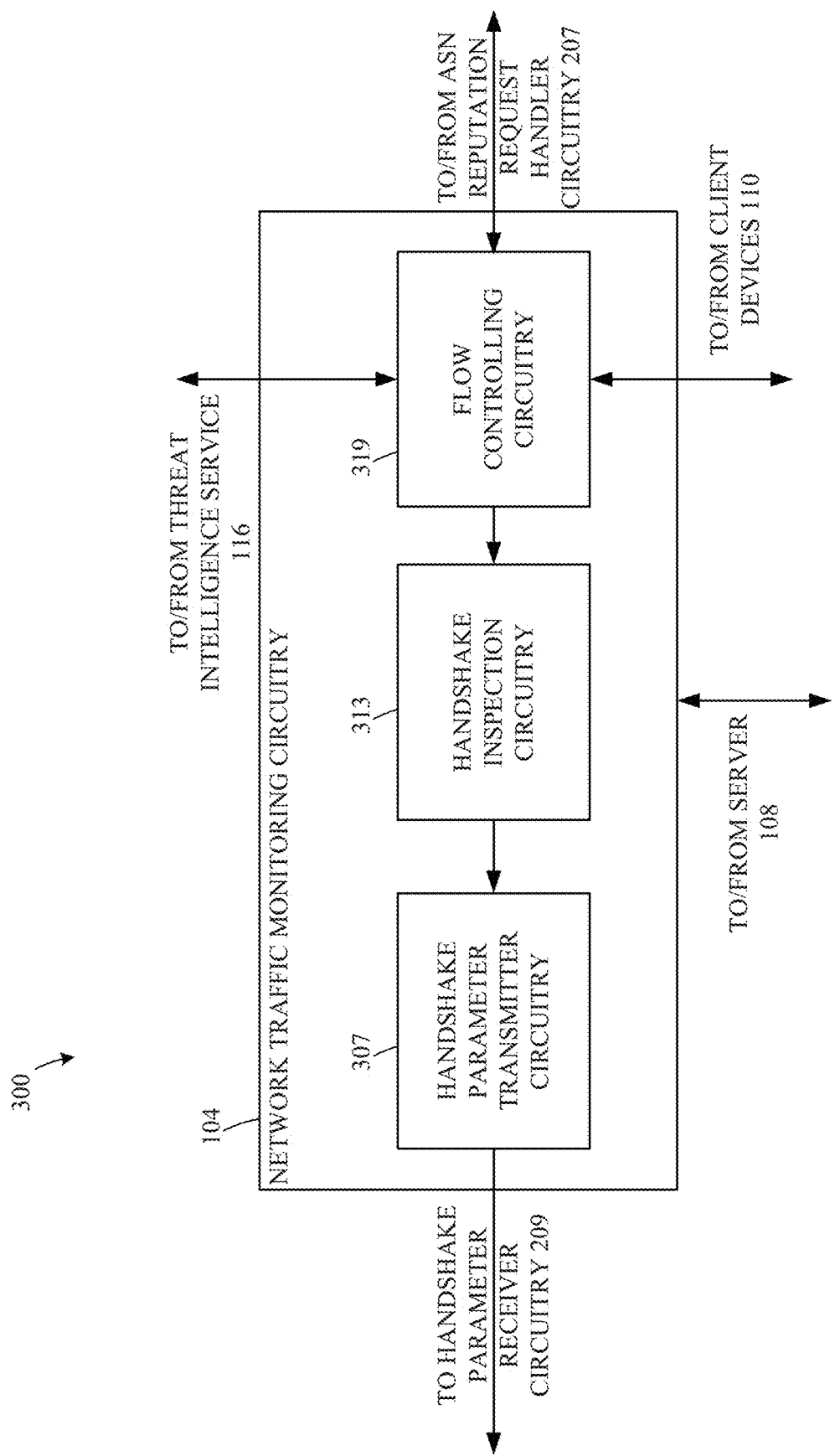
FIG. 3 is a block diagram of an example implementation of the network traffic monitoring circuitry shown in FIG. 1.

FIG. 3 is a block diagram 300 providing additional detail for the example network traffic monitoring circuitry 104 illustrated in FIG. 1. The example network traffic monitoring circuitry 104 includes example handshake parameter transmitter circuitry 307, example handshake inspection circuitry 313, and example flow controlling circuitry 319. For clarity, FIG. 3 does not depict some components of the network traffic monitoring circuitry 104 that are used for other tasks like transforming, filtering, and manipulating data traffic.

The example network traffic monitoring circuitry 104 is implemented with the capability of inspecting communications that occur between the example client devices 110 and the example server 108. The example server 108 is a computing device capable of hosting services that client devices 110 access via any network (e.g., the Internet). In the illustrated example of FIG. 1, the network traffic monitoring circuitry 104 transforms, inspects, filters, and/or otherwise manipulates communication traffic between the client devices 110 and the server 108. In examples disclosed herein, the network traffic monitoring circuitry 104 queries the example ASN reputation managing circuitry 102 to receive instructions on whether inspection of a data flow should be performed.

The example ASN reputation managing circuitry 102 communicates with one or more of example network traffic monitoring circuitry 104 to allow the skipping, bypassing, and/or otherwise prevention of data flow inspections based on secure ASNs. In examples disclosed herein, the ASN reputation managing circuitry 102 generates an ASN greenlist (e.g., a list of acceptable ASNs) based on the reputations of IP addresses contained within the AS.

When example network traffic monitoring circuitry 104 transmits inspection skipping queries in response to detecting a data flow, the example ASN reputation managing circuitry 102 associates the destination of the data flow with an ASN. As described in further detail below, the example ASN reputation managing circuitry 102 performs a query of the example ASN greenlist to verify if the data flow ASN and/or information associated with the ASN is present. In response to the query and/or verification, the example ASN reputation managing circuitry 102 instructs the example network traffic monitoring circuitry 104 to act accordingly. Other example implementations designate the status of one or more ASNs as malicious, non-malicious, or unknown and perform a lookup of all ASNs to find the status associated with the data flow ASN.

In examples disclosed herein, the example ASN reputation managing circuitry 102 compiles a secondary greenlist to further improve data flow inspection for the network traffic monitoring circuitry 104. Example secondary greenlists utilize the results from previous data flow inspections to determine if inspection of a data flow should be skipped. As described in further detail below, the example ASN reputation managing circuitry 102 collects handshake parameters from the example network traffic monitoring circuitry 104 during inspection and adds a data flow destination (e.g., IP address, domain name, etc.) to the example secondary greenlist when the example network traffic monitoring circuitry 104 indicates a successful data inspection of the data flow.

The example ASN greenlist generation circuitry 203 queries the example domain listing service 114 and/or the example threat intelligence service 116 for a list of known domains having both malicious and non-malicious domains. The domain listing service 114 includes any network service that provides the names of known domains. Such services include, but are not limited to, Majestic Million, transparency logs, and/or BlackWeb. The threat intelligence service 116 includes any network service that provides reputation and category information of known domains. Such services include, but are not limited to, McAfee's Global Threat Intelligence, Quad9, and/or Comodo DNS. The example list of known domains includes responses from a single domain listing service 114 and/or a single threat intelligence service 116, however, in other examples disclosed herein the list of known domains includes responses from multiple example domain listing services 114 and/or example threat intelligence services 116. The example ASN greenlist generation circuitry 203 then collects a list of public subnets (e.g., logical division of an IP network) of all routers that are utilizing the services of the example ASN reputation managing circuitry 102 from a cloud service capable of distributing such information. Each of the public subnets is then used to collect the destination IP addresses nearest the geographic location of the example client devices 110 using EDNS Client Subnet (ECS), an extension of DNS recursive resolution. Examples disclosed herein utilize ECS, however, any method of resolving nearest destination IP addresses (e.g., standard DNS recursive resolution, etc.) can be utilized. Other example implementations wherein, the example ASN reputation managing circuitry 102 is run by the example ISP cloud 106, forgo the collection of a list of public subnets and use the public subnet that the example ISP Cloud 106 is serving when resolving the IP addresses from domain names.

The example ASN greenlist generation circuitry 203 queries the example threat intelligence service 116 for reputation and category information for all the known domains collected initially. The example reputation and category information includes, but is not limited to, any data regarding the security of a domain, such as phishing attempts associated with the domain, and/or a category defining the services provided by the domain. In examples disclosed herein, the ASN greenlist generation circuitry 203 creates a separate list of associated domain names, nearest IP addresses, and reputation and category information for each public subnet. In other example implementations (e.g., when a list of public subnets was not collected), the ASN greenlist generation circuitry 203 creates a list of associated domain names, nearest IP addresses, and reputation and category information for the public subnet the ISP cloud 106 is serving. In still other examples, the ASN greenlist generation circuitry 203 associates identified network domains with corresponding ASNs.

In the example illustrated of FIG. 1, the ASN greenlist generation circuitry 203 queries the example internet number registry service 112 to obtain the ASN associated with each domain IP address. The example internet number registry service 112 includes any public repository providing access to numbers identifying internet entities (e.g., IP addresses, ASNs, etc.) including but not limited to the Internet Assigned Numbers Authority (IANA). In other examples, the ASN greenlist generation circuitry 203 obtains the ASN associated with each domain IP address by utilizing query and response protocols accessing databases (e.g., WhoIS) that store Internet resource ownership data. In examples disclosed herein this process occurs for all the public subnets collected previously and the domain IP addresses used are those nearest the geographic location of the public subnet being processed. In other examples, the list of public subnets is not collected, the process occurs for the public subnet the ISP cloud 106 is serving. Concurrently, while the example Internet Number Registry Service 112 responds to the query by the example ASN greenlist generation circuitry 203 for the ASN associated with each of the IP addresses used, a sharing ratio of each of these IP addresses is calculated by the example ASN greenlist generation circuitry 203. As used herein, a "sharing ratio" for an IP address is the number of network domains that utilize the IP address. The greenlist generation circuitry 203 identifies any number of network domains that are available to and/or otherwise accessible by at least one client device in a geographic location of interest. In examples disclosed herein, the sharing ratio is used to help improve flow control on example traffic monitors handling VPN connections needing to be tunneled, however, other example implementations can reduce complexity of the process by not calculating the sharing ratio. The example ASN greenlist generation circuitry 203 then groups all IP addresses by associated ASN.

In examples disclosed herein the ASN greenlist generation circuitry 203 designates (sometimes referred to herein as assigns or classifies) the statuses of ASNs as greenlisted (e.g., non-malicious), redlisted (e.g., malicious), or unknown for each of the public subnets. In examples where a list of public subnets is not available, the statuses of ASNs are designated as greenlisted, redlisted, or unknown and such designation is used for all the example network traffic monitoring circuitry 104 requesting reputation information for skipping data flow inspection within the geographic region the example ISP cloud 106 services. For each ASN in an example public subnet, the reputation and category information linked to the IP addresses associated with the ASN is used to calculate the percentage of IP addresses hosting non-malicious domains and to calculate the percentage of IP addresses hosting malicious domains.

The example ASN greenlist generation circuitry 203 designates the status of the ASN as redlisted if the percentage of malicious domains does not satisfy a malicious domain threshold value. When the status of the ASN is not classified as redlisted the example ASN greenlist generation circuitry 203 designates the status of the ASN as greenlisted if a non-malicious domain threshold value is satisfied. When the status of the ASN is neither redlisted nor greenlisted the example ASN greenlist generation circuitry 203 designates the status of the ASN as unknown. In other example implementations the order in which the percentages are compared with threshold values could be swapped (e.g., percentage of non-malicious followed by percentage of malicious). In example implementations, the ASNs with greenlisted status are grouped together for each public subnet and stored on the example ASN greenlist data store 205 by the example ASN greenlist generation circuitry 203 to streamline the process of responding to example network traffic monitoring circuitry 104 queries. In other implementations, the public subnet served by the example ISP cloud 106 is used, the example ASN greenlist generation circuitry 203 stores the ASN greenlist corresponding to the geographic region the example ISP cloud 106 services.

In examples disclosed herein, the example ASN greenlist generation circuitry 203 stores all the ASNs with greenlisted status for a geographic location in the same grouping in the example ASN greenlist data store 205. This becomes the geographic location's ASN greenlist that is accessed by the example ASN reputation request handling circuitry 207 to determine if inspection on data flows monitored by the example network traffic monitoring circuitry 104 should be skipped. In example implementations the example ASN greenlist data store 205 receives ASNs from the example ASN greenlist generation circuitry 203 that are stored within the ASN greenlist data store 205. In other example implementations, in addition to the ASN itself, the example ASN greenlist generation circuitry 203 stores other identifying characteristics associated with an ASN (e.g., the name of the organization acting as network controller for the autonomous system) in the example ASN greenlist data store. Other example implementations store an entry for all ASNs collected previously and save the status determined (i.e., greenlist, redlist, and unknown).

In operation, the example flow controlling circuitry 319 detects a request made by the example client devices 110 to access domains and/or services corresponding to the example server 108. The onset of this request initiates a handshake between the example client devices 110 and the example server 108. In examples disclosed herein, the example data flows inspected are TLS 1.3 flows, however, the methods and apparatus can be applied to any data flow such as http flows and/or lower TLS version flows (e.g., TLS 1.1 and TLS 1.2). After observing requests from the client devices 110, the example flow controller circuitry 319 queries the example threat intelligence service 116 with a request for information corresponding to the domain being accessed by the client devices 110. When the example flow controller circuitry 319 receives a response that the domain has a bad reputation (e.g., a reputation failing to satisfy a threshold reputation value), actions are taken to prevent the user from connecting to a malicious domain (e.g., the user is redirected to a block page). When the domain has an acceptable reputation (e.g., a reputation that satisfies a threshold reputation value), the example flow controller circuitry 319 utilizes recursive resolutions (e.g., ECS or standard DNS recursive resolution) to determine the destination IP address for the client device 110 request. The example flow controller circuitry 319 then sends and/or otherwise transmits the resolved destination IP address to the example ASN reputation request handling circuitry 207. In examples disclosed herein the transmission includes the destination IP address of the example server 108, however, any identifying information that can link the destination of the example data flow to an ASN can be transmitted.

The example ASN reputation request handling circuitry 207 obtains the IP address from the example flow controller circuitry 319. The example ASN reputation request handling circuitry 207 then queries the example internet number registry service 112 with the IP address from the example flow controller circuitry 319 and obtains the ASN associated with the IP address. The ASN reputation request handling circuitry 207 then compares the obtained ASN to an ASN greenlist, stored in the example ASN greenlist data store 205, to determine if the ASN is secure. In the examples disclosed herein, the ASN greenlist is the list specific to the geographic location of the example network traffic monitoring circuitry 104 making the reputation request. When the ASN is present on the ASN greenlist, the example ASN reputation request handling circuitry 207 alerts the example flow controller circuitry 319 to skip, bypass, and/or otherwise prevent inspection of the current data flow. When the ASN is not present on the ASN greenlist, the example ASN reputation request handling circuitry 207 instructs the example flow controller circuitry 319 to begin inspection of the flow.

When the example flow controller circuitry 319 is instructed to start inspection, this circuitry communicates with the example handshake inspection circuitry 313 to begin inspection of the handshake between the client devices 110 and the example server 108. In examples disclosed herein the handshake inspection circuitry 313 performs inspections of TLS 1.3 handshakes, however, the circuitry is not limited to inspecting TLS 1.3 flows but also applies to http, lower versions of TLS flows (e.g., TLS 1.1 and TLS 1.2), etc. The example handshake inspection circuitry 313 collects specific handshake parameters (e.g., ServerHello Size, ClientHello parameters, etc.) and transmits them to the example handshake parameter transmitter circuitry 307. The example ClientHello parameters include, but are not limited to, a random number, cipher suites, and compression techniques. The example handshake parameter transmitter circuitry 307 transmits these collected parameters to the example handshake parameter receiver circuitry 209.

In the examples disclosed herein, the ASN reputation requesting handling circuitry 207 compares the IP address to an example TTL greenlist stored in the example TTL greenlist data store 213. Even when the IP address is contained in the example TTL greenlist, the example ASN reputation request handling circuitry 207 still compares the handshake parameters obtained by the example handshake parameter receiver circuitry 209 to the values stored with the corresponding IP address in the example TTL greenlist data store 213. Multiple services can be hosted on one IP address and thus a destination IP address hosting at least one non-malicious domain will be placed on the TTL greenlist when connection to that non-malicious domain is inspected. However, the possibility exists that other domains sharing the IP address could be malicious and comparing handshake parameters ensures that each of these services is inspected at least once before being part of the greenlist. Stated differently, each IP address and/or service is vetted prior to being added to the greenlist. When the destination IP address is present on the TTL greenlist and the handshake parameters received by the example handshake parameter receiver circuitry 209 match, the example ASN reputation request handling circuitry 207 alerts the example flow controlling circuitry 319 to skip, bypass, and/or otherwise prevent the rest of the inspection. As a result, this secondary list allows for computational workload of example network traffic monitoring circuitry 104 to be further reduced due to inspections not needing to be completed for flows to a destination that was recently inspected. However, when the IP address is not contained in the TTL greenlist and/or the handshake parameters do not match, the example flow controller circuitry 319 completes the inspection of the data flow.

In example occurrences in which the example handshake inspection circuitry 313 completes inspection and determines the connection to the destination IP address is non-malicious, the example flow controlling circuitry 319 alerts the example ASN reputation request handling circuitry 207 that the inspection was successful. The example handshake parameter receiver circuitry 209 gathers handshake parameters from the inspection received prior and stores them in the example TTL greenlist data store 213 along with the destination IP address, domain name, and TTL value associated with the data flow. These results can be used throughout the entirety of the original flows lifespan (TTL value) to allow for inspection to be skipped on data flows to the same destination from other client devices 110.

In examples disclosed herein that utilize VPNs, the flow controller circuitry 319 communicates with the example ASN reputation request handling circuitry 207 to determine if tunneling is necessary for certain flows. When it is determined that an example data flow is traveling to a non-malicious destination, the example flow controller circuitry 319 will be notified by the ASN reputation request handling circuitry 207 that the current data flow does not need to be tunneled based on the sharing ratio associated with that IP address. When the sharing ratio satisfies a threshold value, the example ASN reputation request handling circuitry 207 alerts the flow controlling circuitry 319 that tunneling for the data flow can be skipped (sometimes referred to as tunneling bypass). When the sharing ratio does not satisfy a threshold value, the flow controlling circuitry 319 will tunnel the flow according to the VPN implementation.

In some examples, the ASN reputation managing circuitry 102 includes means for managing ASNs. For example, the means for managing ASNs may be implemented by ASN reputation managing circuitry 102. In some examples, the ASN reputation managing circuitry 102 may be implemented by machine executable instructions such as that implemented by at least blocks 402-418 of FIG. 4 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the ASN reputation managing circuitry 102 is implemented by other hardware logic circuitry, hardware implemented state machines, and/or any other combination of hardware, software, and/or firmware. For example, the ASN reputation managing circuitry 102 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the ASN greenlist generation circuitry 203 includes means for generating ASN greenlists. For example, the means for generating ASN greenlists may be implemented by ASN greenlist generation circuitry 203. In some examples, the ASN greenlist generation circuitry 203 may be implemented by machine executable instructions such as that implemented by at least blocks 402-416 of FIG. 4 and 501-525 of FIG. 5 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the ASN greenlist generation circuitry 203 is implemented by other hardware logic circuitry, hardware implemented state machines, and/or any other combination of hardware, software, and/or firmware. For example, the ASN greenlist generation circuitry 203 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the ASN reputation request handling circuitry 207 includes means for handling ASN reputation requests. For example, the means for handling ASN reputation requests may be implemented by ASN reputation request handling circuitry 207. In some examples, the ASN reputation request handling circuitry 207 may be implemented by machine executable instructions such as that implemented by at least blocks 418 of FIG. 4 as well as 602-606 and 610-624 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the ASN reputation request handling circuitry 207 is implemented by other hardware logic circuitry, hardware implemented state machines, and/or any other combination of hardware, software, and/or firmware. For example, the ASN reputation request handling circuitry 207 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the handshake parameter receiver circuitry 209 includes means for receiving handshake parameters. For example, the means for managing for receiving handshake parameters may be implemented by handshake parameter receiver circuitry 209. In some examples, the handshake parameter receiver circuitry 209 may be implemented by machine executable instructions such as that implemented by at least blocks 608 of FIG. 6 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the handshake parameter receiver circuitry 209 is implemented by other hardware logic circuitry, hardware implemented state machines, and/or any other combination of hardware, software, and/or firmware. For example, the handshake parameter receiver circuitry 209 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the network traffic monitoring circuitry 104 includes means for monitoring network traffic. For example, the means for monitoring network traffic may be implemented by network traffic monitoring circuitry 104. In some examples, the network traffic monitoring circuitry 104 may be implemented by machine executable instructions such as that implemented by at least blocks 701-733 of FIG. 7 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the network traffic monitoring circuitry 104 is implemented by other hardware logic circuitry, hardware implemented state machines, and/or any other combination of hardware, software, and/or firmware. For example, the network traffic monitoring circuitry 104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the handshake parameter transmitter circuitry 307 includes means for transmitting handshake parameters. For example, the means for transmitting handshake parameters may be implemented by handshake parameter transmitter circuitry 307. In some examples, the handshake parameter transmitter circuitry 307 may be implemented by machine executable instructions such as that implemented by at least blocks 818 of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the handshake parameter transmitter circuitry 307 is implemented by other hardware logic circuitry, hardware implemented state machines, and/or any other combination of hardware, software, and/or firmware. For example, the handshake parameter transmitter circuitry 307 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the handshake inspection circuitry 313 includes means for inspecting handshakes. For example, the means for inspecting handshakes may be implemented by handshake inspection circuitry 313. In some examples, the handshake inspection circuitry 313 may be implemented by machine executable instructions such as that implemented by at least blocks 816, 822, and 824 of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the handshake inspection circuitry 313 is implemented by other hardware logic circuitry, hardware implemented state machines, and/or any other combination of hardware, software, and/or firmware. For example, the handshake inspection circuitry 313 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the flow controlling circuitry 319 includes means for controlling flow. For example, the means for controlling flow may be implemented by flow controlling circuitry 319. In some examples, the flow controlling circuitry 319 may be implemented by machine executable instructions such as that implemented by at least blocks 709-729 of FIG. 8 as well as 810-814, 820, and 826-828 of FIG. 8 executed by processor circuitry, which may be implemented by the example processor circuitry 912 of FIG. 9, the example processor circuitry 1000 of FIG. 10, and/or the example Field Programmable Gate Array (FPGA) circuitry 1100 of FIG. 11. In other examples, the flow controlling circuitry 319 is implemented by other hardware logic circuitry, hardware implemented state machines, and/or any other combination of hardware, software, and/or firmware. For example, the flow controlling circuitry 319 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the ASN reputation managing circuitry 102 and the network traffic monitoring circuitry 104 of FIGS. 2 and 3, respectively, is illustrated in FIGS. 1 through 3, one or more of the elements, processes, and/or devices illustrated in FIGS. 1 through 3 may be combined, divided, re-arranged, omitted, eliminated, and/or implemented in any other way. Further, the example ASN greenlist generation circuitry 203, the example ASN greenlist data store 205, the example ASN reputation request handling circuitry 207, the example handshake parameter receiver circuitry 209, the example TTL greenlist data store 213, and/or, more generally, the example ASN reputation managing circuitry 102 of FIGS. 1 and 2, as well as the example handshake parameter transmitter circuitry 307, the example handshake inspection circuitry 313, the example flow controlling circuitry 319, and/or, more generally, the example network traffic monitoring circuitry 104 of FIGS. 1 and 3, may be implemented by hardware, software, firmware, and/or any combination of hardware, software, and/or firmware. Thus, for example, any of the example ASN greenlist generation circuitry 203, the example ASN greenlist data store 205, the example ASN reputation request handling circuitry 207, the example handshake parameter receiver circuitry 209, the example TTL greenlist data store 213, and/or, more generally, the example ASN reputation managing circuitry 102 of FIGS. 1 and 2, as well as the example handshake parameter transmitter circuitry 307, the example handshake inspection circuitry 313, the example flow controlling circuitry 319, and/or, more generally, the example network traffic monitoring circuitry 104 of FIGS. 1 and 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example ASN greenlist generation circuitry 203, the example ASN greenlist data store 205, the example ASN reputation request handling circuitry 207, the example handshake parameter receiver circuitry 209, the example TTL greenlist data store 213, and/or, more generally, the example ASN reputation managing circuitry 102 of FIGS. 1 and 2, as well as the example handshake parameter transmitter circuitry 307, the example handshake inspection circuitry 313, the example flow controlling circuitry 319, and/or, more generally, the example network traffic monitoring circuitry 104 of FIGS. 1 and 3, is/are hereby expressly defined to include a non-transitory computer readable storage device or storage disk such as a memory, a digital versatile disk (DVD), a compact disk (CD), a Blu-ray disk, etc., including the software and/or firmware. Further still, the example ASN reputation managing circuitry 102 and network traffic monitoring circuitry 104 of FIGS. 1 through 3 may include one or more elements, processes, and/or devices in addition to, or instead of, those illustrated in FIGS. 2 and/or 3, and/or may include more than one of any or all of the illustrated elements, processes and devices.

Flowcharts representative of example hardware logic circuitry, machine readable instructions, hardware implemented state machines, and/or any combination thereof for implementing the ASN reputation managing circuitry 102 and/or the example network traffic monitoring circuitry 104 of FIGS. 1 through 3 is shown in FIGS. 4 through 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The programs may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example programs are described with reference to the flowcharts illustrated in FIGS. 4 through 8, many other methods of implementing the example ASN reputation managing circuitry 102 and/or the example network traffic monitoring circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4 through 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
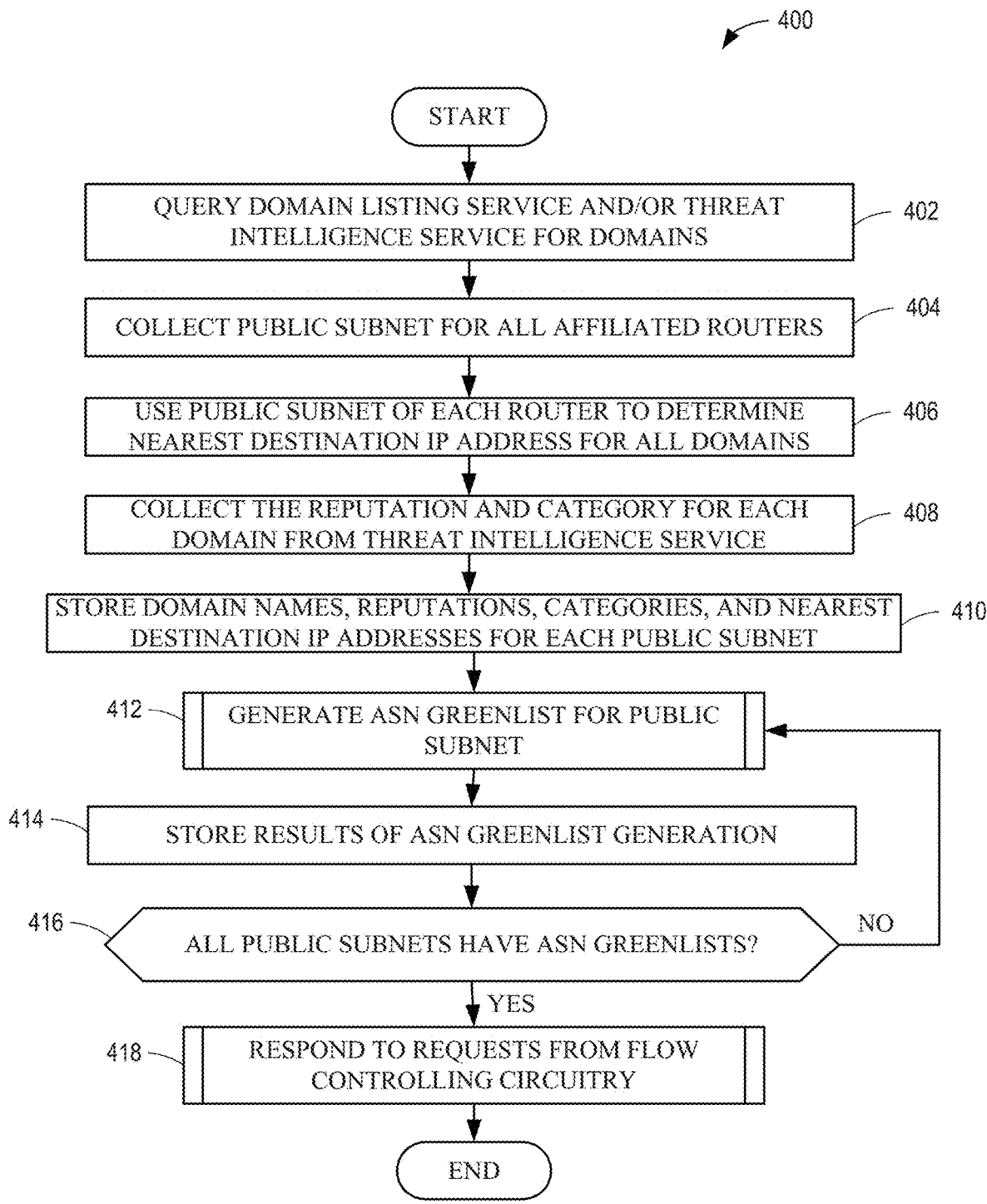
FIG. 4 is a flowchart representative of example machine readable instructions that may be executed by example processor circuitry to implement the ASN reputation managing circuitry of FIGS. 1 and/or 2.

FIG. 4 is a flowchart representative of example machine readable instructions and/or example operations 400 that may be executed and/or instantiated by processor circuitry to generate ASN greenlists and handle reputation requests from the example network traffic monitoring circuitry 104. The machine readable instructions and/or operations 400 of FIG. 4 begin at block 402, at which the example ASN greenlist generation circuitry 203 queries the example domain listing service 114 and/or the example threat intelligence service 116, to receive, retrieve, identify, and/or otherwise obtain a list with both malicious and non-malicious domains. In some examples, queries to the example domain listing service 114 and/or the example threat intelligence service 116 are focused on one or more particular geographic areas of interest, such as a particular city, a particular region of a state/country, and/or a particular network boundary (e.g., a corporate domain and corresponding network(s)). As such, the example greenlist generation circuitry identifies network domains that are accessible by at least one client device in the one or more geographic areas of interest.

At block 404, the example ASN greenlist generation circuitry 203 collects the public subnet values for all routers utilizing the ASN reputation service from the example ASN reputation managing circuitry 102. In other examples, the ASN reputation managing circuitry 102 is responsive to the example ISP cloud 106 and does not require a list of public subnets, the example ASN greenlist generation circuitry 203 skips and/or otherwise bypasses the collection or query for public subnet values (block 404). At block 406, the example ASN greenlist generation circuitry 203 uses the public subnet of a router to determine the nearest IP address (e.g., geographically) for all domains collected by the example ASN greenlist generation circuitry 203 (block 402). For example, the ASN greenlist generation circuitry 203 uses the public subnet to perform ECS. In other examples the destination IP addresses are determined using other resolution techniques (e.g., standard DNS recursive resolution).

At block 408, the example ASN greenlist generation circuitry 203 collects information regarding the reputation and category of each domain collected at block 402 from the example threat intelligence service 116. The example ASN greenlist generation circuitry 203 stores domain names, reputations, categories, and resolved IP addresses are then stored as lists for each public subnet (e.g., temporarily) at block 410. In examples that do not include a list of public subnets, the example ASN greenlist generation circuitry 203 stores the lists for the geographic location that utilizes the service (e.g., the geographic region serviced by the example ISP cloud 106).

Blocks 412-416 illustrate an iterative process that occurs for each public subnet. In examples that do not include public subnets, the above process occurs for the geographic location that would utilizes the service (e.g., the geographic region serviced by the example ISP cloud 106). At block 412, the ASN greenlist is generated for the public subnet (or geographic location) by the example ASN greenlist generation circuitry 203. The process of greenlist generation from block 412 is further defined in FIG. 5. The example ASN greenlist generation circuitry 203 stores the ASN greenlist in the ASN greenlist data store 205 in a separate location for each public subnet at block 414. At block 416, the example ASN greenlist generation circuitry 203 determines if there are more public subnets (or geographic locations) that still need to have the ASN greenlist generated, repeating steps 412-416 until all ASN greenlists are generated.

In example implementations, the process formed by blocks 402-416 can be repeated as often as necessary. Repeating these steps provides updates to the greenlists to account for including, but not limited to, changes in the domains available to the public, reputations and/or categories of domains, and IP addresses associated with domains. By updating greenlists, network traffic flow inspection can remain efficient as well as secure.

At block 418, the example ASN reputation request handling circuitry 207 handles and/or otherwise processes reputation requests from example network traffic monitoring circuitry 104. The process at block 418 is described in greater detail in FIG. 6.

Figure 5:
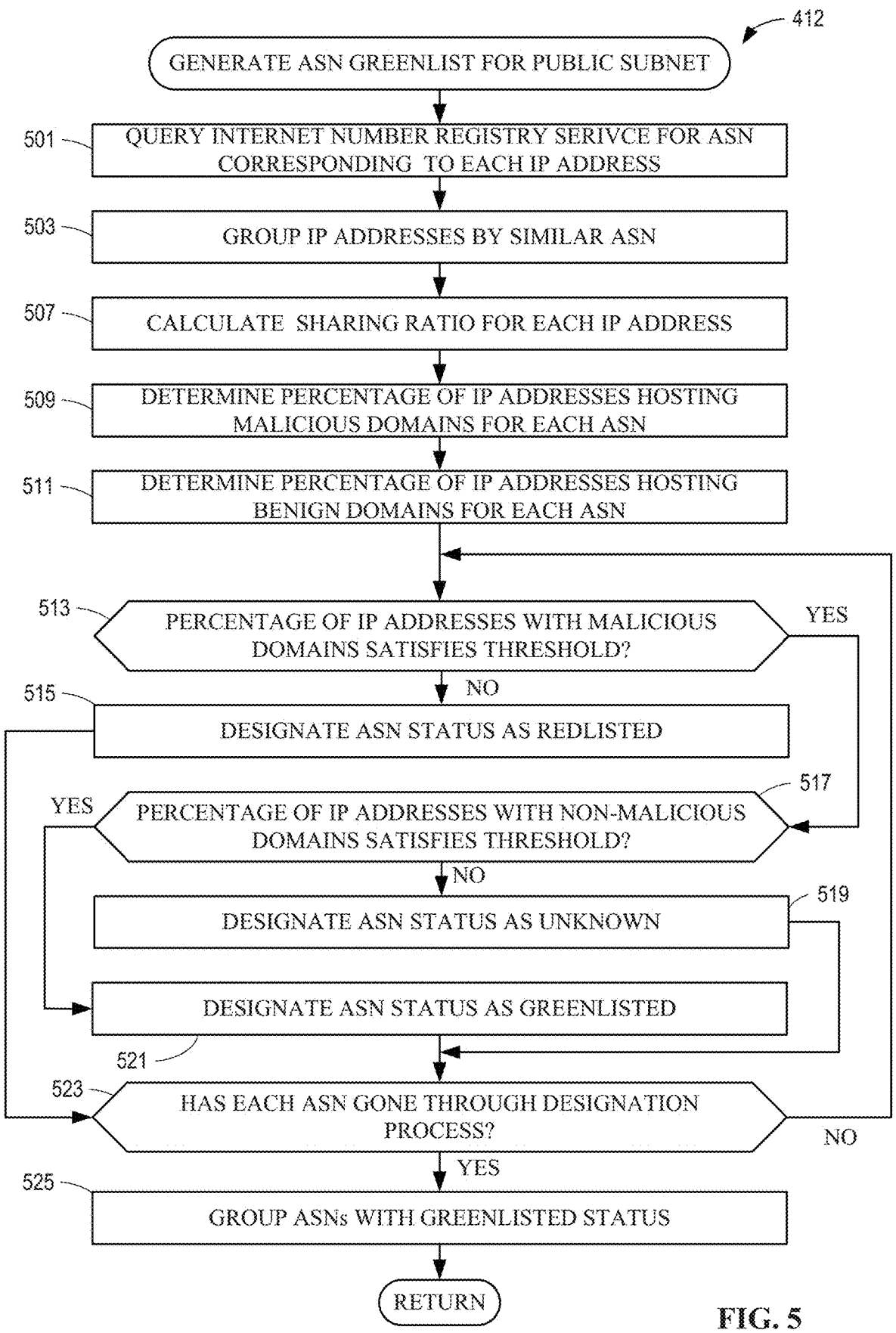
FIG. 5 is a flowchart representative of example machine readable instructions that may be executed by example processor circuitry to implement the ASN greenlist generation circuitry of FIG. 2.

FIG. 5 is a flowchart representative of example machine readable instructions and/or example operations 412 that may be executed and/or instantiated by processor circuitry to generate an ASN greenlist for a given geographic region. The machine readable instructions and/or operations 412 of FIG. 4 begin at block 501, at which the example ASN greenlist generation circuitry 203 queries the example Internet number registry service 112 with each of the IP addresses resolved at block 406 and obtains the ASN associated with the IP address.

At block 503, the example ASN greenlist generation circuitry 203 groups the IP addresses together by ASN. For example, all IP addresses sharing the ASN (e.g., 15169 corresponding to Google), would be grouped together. At block 507, the example ASN greenlist generation circuitry 203 calculates the sharing ratio of each IP address by determining and/or otherwise calculating the number of domains associated with that IP address. The process at block 507 is performed in example implementations utilizing VPNs for added network security and is skipped in examples not using VPNs.

At block 509, the example ASN greenlist generation circuitry 203 uses the reputation and category information associated with each domain to determine the percentage of IP addresses, sharing the ASN, hosting malicious domains for each ASN. At block 511, the example ASN greenlist generation circuitry 203 performs the same process, however, the percentage of IP addresses, sharing the ASN, hosting non-malicious domains is calculated. In other example implementations the order in which 509 and 511 is reversed and still accomplishes the same task.

Blocks 513-523 demonstrate an iterative process where the example ASN greenlist generation circuitry 203 designates a status of an ASN as greenlisted, redlisted, or unknown. For example, the ASN (e.g., 15169 corresponding to Google), has an example percentage of 94% non-malicious domains and an example percentage of 0.7% malicious domains. At block 513, the example ASN greenlist generation circuitry 203 observes and/or otherwise calculates the percentage of malicious domains hosted by the ASN by comparing the percentage to a threshold value. In some examples, the allowable malicious domain threshold is 1%. For the ASN (e.g., 15169 corresponding to Google), when the example ASN greenlist generation circuitry 203 compares the percentage of malicious domains to the threshold and if it satisfies the threshold, the process moves to block 517. In the example disclosed above satisfying the threshold requires the percentage to be lower than that of the threshold, however, other implementations can have other standards for satisfying the threshold (e.g., greater than, greater than or equal to, less than or equal to, etc.). At block 517, the example ASN greenlist generation circuitry 203 observes the percentage of non-malicious domains hosted by the ASN by comparing the percentage to a threshold value. For example, the allowable non-malicious domain threshold is 90%. For the example ASN (e.g., 15169 corresponding to Google), when the example ASN greenlist generation circuitry 203 determines that the percentage of non-malicious domains compares to the threshold in a manner that it satisfies the threshold, the process moves to block 521 and the example ASN greenlist generation circuitry 203 designates the status of the ASN as greenlisted. In the example disclosed above satisfying the threshold requires the percentage to be greater than that of the threshold, however, other implementations can have other standards for satisfying the threshold (e.g., less than, greater than or equal to, less than or equal to, etc.).

In examples disclosed herein, the ASN greenlist generation circuitry 203 modulates the threshold values to produce different ASN status designations depending on the needs of the home and/or enterprise. For a more secure operation, the thresholds for malicious and non-malicious domains can become stricter. For example, the allowable malicious domains threshold could be changed to 0.5%, this would cause the example ASN greenlist generation circuitry 203 to designate the status of the example ASN as redlisted (e.g., 15169 corresponding to Google), at block 515. Another example of stricter thresholds is to set the non-malicious domains threshold to 95%, causing the status of the example ASN, 15169 (Google), to be designated as unknown by the example ASN greenlist generation circuitry 203 at block 519. In example implementation, to increase the number of flow inspections skipped on the example network traffic monitoring circuitry 104, the threshold values can be altered to allow for more ASNs to be greenlisted and reduce the computational load. Other implementations alter threshold values accordingly to match the chosen threshold scheme (e.g., lower than malicious threshold and greater than non-malicious threshold, etc.).

At block 523, the example ASN greenlist generation circuitry 203 determines if the status of every ASN for a given geographic location is designated as greenlisted, redlisted, or unknown. When statuses of ASNs still need a designation, the example ASN greenlist generation circuitry 203 goes back to block 513 and performs the designation process again for a new ASN. When the statuses of all ASNs have been designated, the example ASN greenlist generation circuitry 203 groups the ASNs with greenlisted (e.g., non-malicious) statuses, forming the ASN greenlist for the geographic region (block 525). The example ASN greenlist generation circuitry 203 then returns to the process defined at block 414 in FIG. 4.

Figure 6:
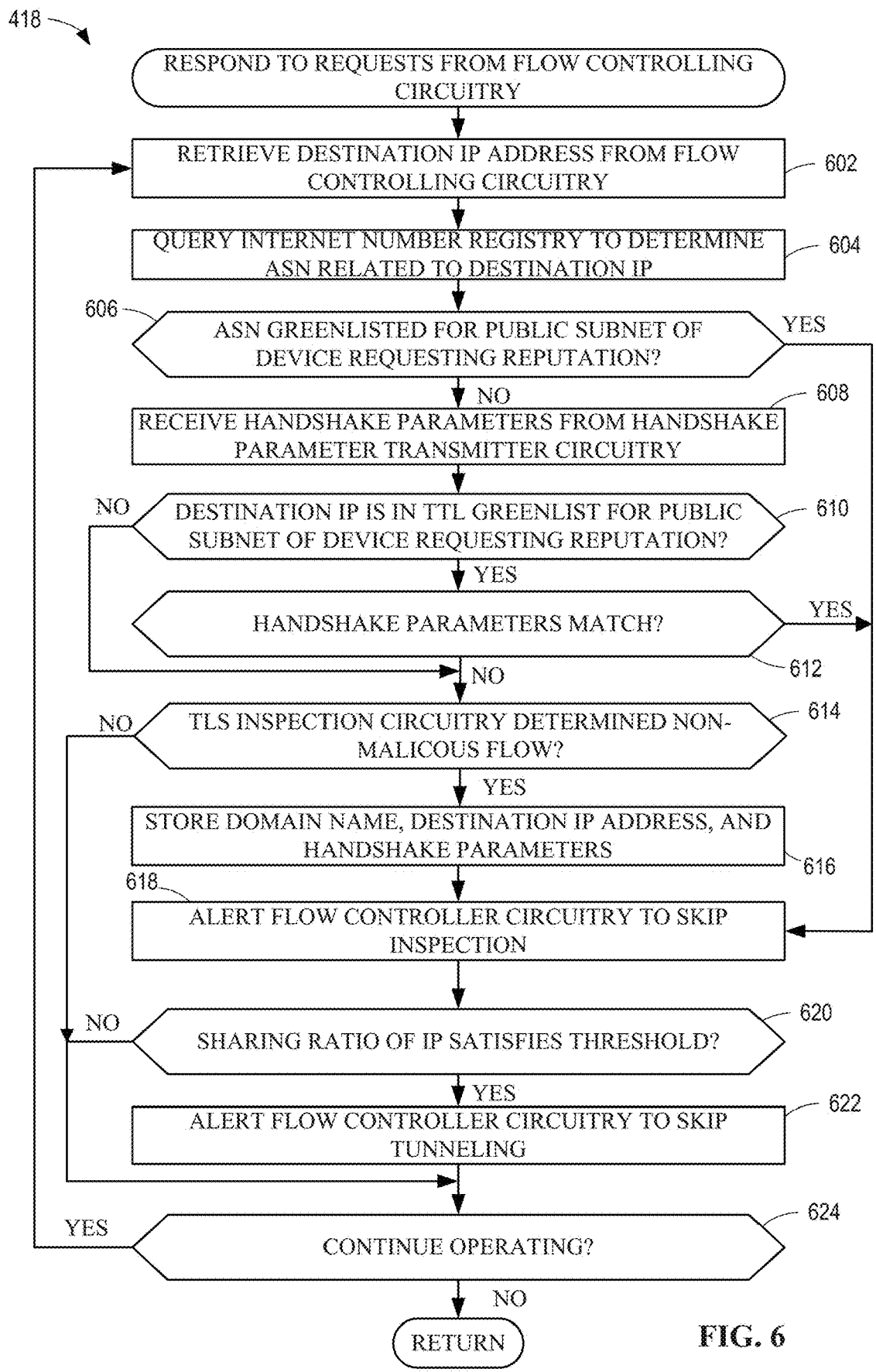
FIG. 6 is a flowchart representative of example machine readable instructions that may be executed by example processor circuitry to implement the ASN reputation request handling circuitry of FIG. 2.

FIG. 6 is a flowchart representative of example machine readable instructions and/or example operations 418 that may be executed and/or instantiated by processor circuitry to handle reputation requests from network traffic monitoring circuitry 104. The machine readable instructions and/or operations 418 of FIG. 4 begin at block 602, at which the example ASN reputation request handling circuitry 207 receives a reputation request for a destination IP address of a network data flow from the example flow controlling circuitry 319. At block 604, the example ASN reputation request handling circuitry 207 queries the example internet number registry service 112 to determine the ASN that contains the destination IP from the example flow controlling circuitry 319.

At block 606, the example ASN reputation request handling circuitry 207 compares the ASN value collected at block 604 against the greenlist, stored in the example ASN greenlist data store 205, for the public subnet of the network traffic monitoring circuitry 104 making the request. When the ASN is found on the greenlist the process moves to block 618 and the example ASN reputation request handling circuitry 207 alerts the example flow controlling circuitry 319 to skip inspection of the current data flow. However when the ASN is not listed on the greenlist, the example flow controlling circuitry 319 instructs the example handshake inspection circuitry 313 to begin inspection of the data flow and collects handshake parameters. The example handshake parameter receiver circuitry 209 will receive handshake parameters (e.g., ServerHello size, ClientHello parameters, TTL value, etc.) from the example handshake parameter transmitter circuitry 307 (block 608). While the inspection begins, the example ASN reputation request handling circuitry 207 compares the IP address received at block 602 against the TTL greenlist, stored in the example TTL greenlist data store 213, for the public subnet of the network traffic monitoring circuitry 104 making the request (block 610). When the IP address is listed in the TTL greenlist, the example ASN reputation request handling circuitry 207 utilizes the handshake parameters collected during the inspection and compares the parameters to those stored in the TTL greenlist along with the IP address (block 612). When the handshake parameters match, the example ASN reputation request handling circuitry 207 alerts the flow controlling circuitry 319 to skip the rest of the inspection at block 618. When the IP address is not found in the TTL greenlist and/or the handshake parameters do not match, the process moves to block 614.

At block 614, the example handshake inspection circuitry 313 has completed inspection of the data flow. When the inspection shows that the connection is secure and not at risk to a security threat, at block 616, the example handshake parameter receiver circuitry 209 stores the handshake parameters (e.g., ServerHello size, ClientHello parameters, etc.) along with the corresponding IP address, domain name, and TTL value in the example TTL greenlist data store 213. In other examples the values stored include any identifying parameters that could be used to associate a given handshake with one previously inspected. When inspection shows that the connection is not secure and/or a security threat was detected that would put the client devices 110 at risk, the flow controlling circuitry 319 redirects client devices 110 away from the threat and to safety (e.g., a block page).

At block 620, the example ASN reputation request handling circuitry 207, compares the sharing ratio of the IP address associated with a data flow and determines if it satisfies a threshold value (block 620). When the threshold is met and a VPN is in use, the example ASN reputation request handling circuitry 207 alerts the flow controlling circuitry 319 to skip tunneling of the data flow (block 622) to save computational power as well as bandwidth on the VPN. In implementations not utilizing a VPN, blocks 620 and 622 can be skipped.

At block 624, the ASN reputation managing circuitry 102 determines if it will continue operation. Events such as updating the greenlists, maintenance of the hardware requiring the apparatus to be shut down, etc. are example reasons for the process to return to the process outlined in FIG. 4. When the ASN reputation managing circuitry 102 decides to keep operating, the process moves to block 602 and waits for a reputation request from the example flow controlling circuitry 319.

The flowcharts of FIGS. 4-6 representative of example machine readable instructions and/or example operations 400, 412, and 418 that may be executed and/or instantiated by processor circuitry to implement the example ASN reputation managing circuitry 102. The operations of the flowcharts from FIGS. 4-6 demonstrated example generation of ASN greenlists and handling of reputation requests from example network traffic monitoring circuitry 104 from an ASN reputation managing point-of-view. The flowcharts of FIGS. 7-8 demonstrate example reputation requesting and skipping of inspection of data flows from a network traffic monitoring point-of-view.

Figure 7:
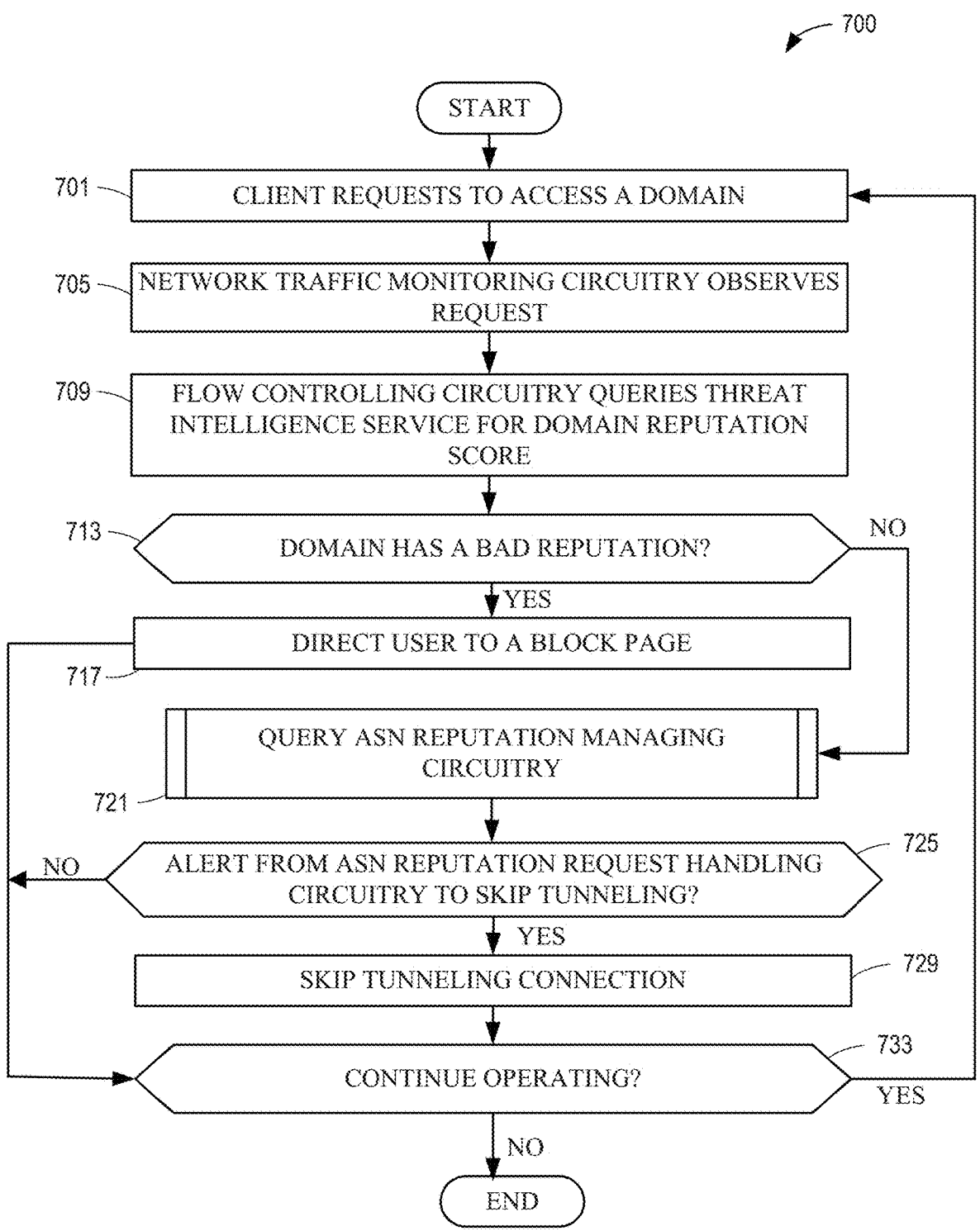
FIG. 7 is a flowchart representative of example machine readable instructions that may be executed by example processor circuitry to implement the network traffic monitoring circuitry of FIGS. 1 and/or 3.

FIG. 7 is a flowchart representative of example machine readable instructions and/or example operations 700 that may be executed and/or instantiated by processor circuitry to provide data flow control and monitoring. The machine readable instructions and/or operations 700 of FIG. 7 begin at block 701, at which the example client devices 110 request to access a domain and/or service hosted on the example server 108. At block 705, the example network traffic monitor circuitry 104 notices the request and begins to observe the connection. At block 709, the example flow controlling circuitry 319 queries the example threat intelligence service 116 with the domain being accessed by the client devices 110 for a domain reputation score and evaluates the reputation score (block 713). When the domain has a bad reputation (e.g., associated with malicious events) the flow controlling circuitry 319 redirects the example client devices 110 away from the domain (e.g., direct to a block page) (block 717) and the process moves to block 733.

Figure 8:
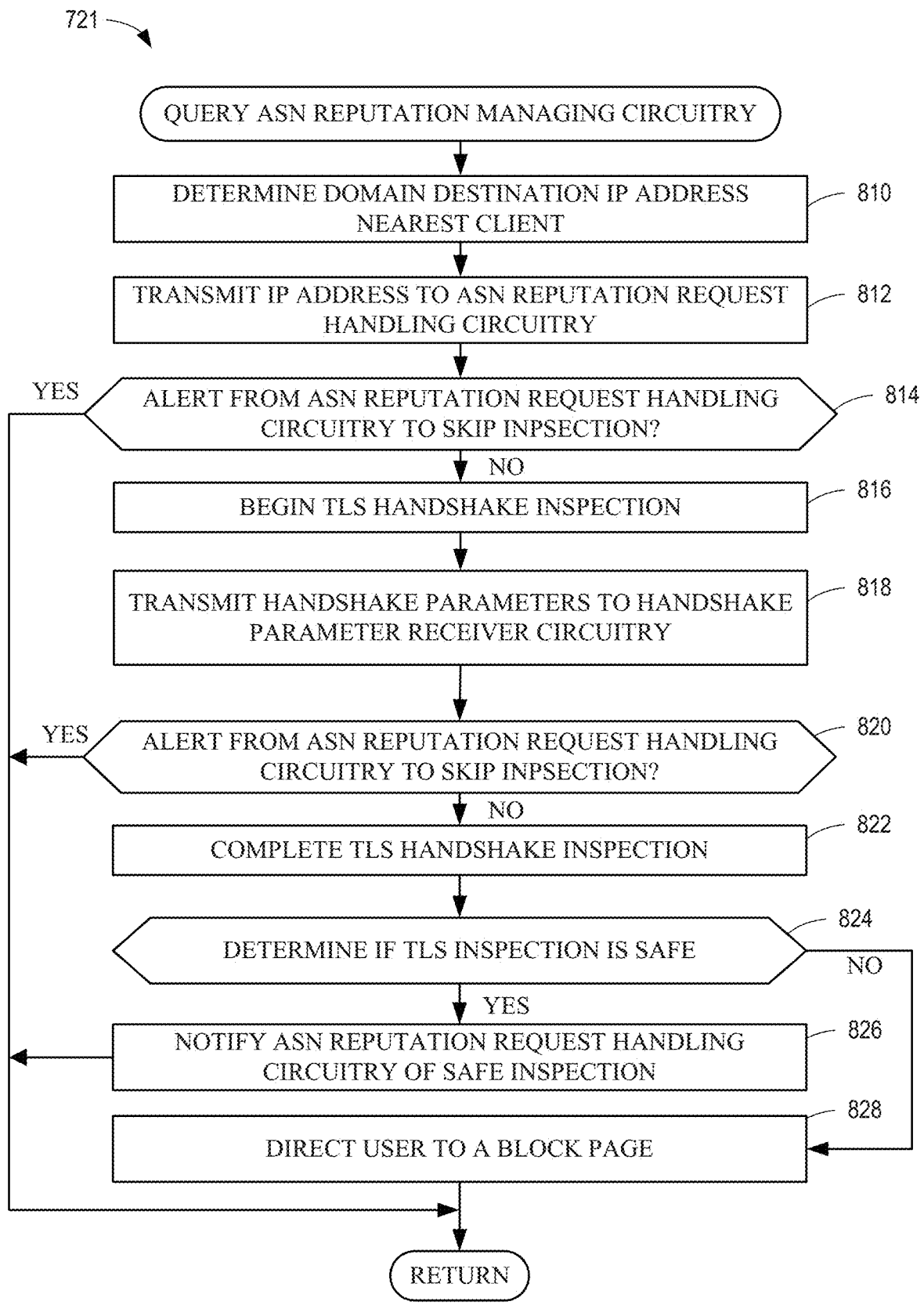
FIG. 8 is a flowchart representative of example machine readable instructions that may be executed by example processor circuitry to implement the flow controlling circuitry of FIG. 3.

When the domain has a good reputation the example flow controlling circuitry 319 queries the ASN reputation managing circuitry 102 to determine if inspection of the data flow can be skipped (block 721). The illustration in FIG. 8 provides further detail on the process contained in block 721. When inspection has been either skipped or completed, the example flow controlling circuitry 319 receives an alert from the example ASN reputation request handling circuitry 207 to skip tunneling for example implementations using VPNs (block 725) and the example flow controlling circuitry 319 skips tunneling (block 729). In other example implementations not using VPNs the steps at blocks 725-729 are bypassed and the process goes to block 733.

At block 733, the network traffic monitor circuitry determines if the device should continue to operate. In the instance that the apparatus is to halt operation the process ends, however, when operation is to continue the process moves to block 701 to wait for another client request to access a domain.

FIG. 8 is a flowchart representative of example machine readable instructions and/or example operations 721 that may be executed and/or instantiated by processor circuitry to facilitate communication between the ASN reputation managing circuitry 102 and the example network traffic monitoring circuitry 104. The machine readable instructions and/or operations 721 of FIG. 7 begin at block 810, at which the example flow controlling circuitry 319 determines the nearest destination IP address associated with the data flow.

At block 812, the example flow controlling circuitry 319 transmits the destination IP address associated with the data flow to the example ASN reputation request circuitry 207. The ASN reputation request handling circuitry 207 conducts the process contained in block 418 of FIG. 4. While the process is occurring the example flow controlling circuitry 319 waits (e.g., for a modifiable period of time) to receive an alert to skip inspection of the data flow (block 814). The example modifiable period of time is dependent upon the methods and apparatus used in transmission. The example modifiable period of time should be long enough to account for any latencies caused by such methods and apparatus, but not long enough to affect performance of the apparatus disclosed herein. When the alert is received from the example ASN reputation request handling circuitry 207, the example flow controlling circuitry 319 notifies the handshake inspection circuitry 313 to skip inspection and the process returns to the process outlined in 700 of FIG. 7. When no alert is received, the example handshake inspection circuitry 313 begins inspection of the data flow (block 816). In other examples, the modifiable period of time is not utilized, the example ASN reputation request handling circuitry 207 sends an alert to skip inspection or an alert to begin inspection to the example flow controlling circuitry 319.

During the inspection, the example handshake inspection circuitry 313 collects handshake parameters (e.g., ServerHello size, ClientHello parameters, etc.) and sends them to the example handshake parameter transmitter circuitry 307. The example handshake parameter transmitter circuitry 307 transmits the handshake parameters to the example handshake parameter receiver circuitry 209 (block 818).

The example flow controlling circuitry 319 continues to wait for an alert from the example ASN reputation request handling circuitry 207 to skip inspection of the data flow (block 820). The example modifiable period of time is dependent upon the methods and apparatus used in transmission. The example modifiable period of time should be long enough to account for any latencies caused by such methods and apparatus, but not long enough to affect performance of the apparatus disclosed herein. When the alert is received from the example ASN reputation request handling circuitry 207, the example flow controlling circuitry 319 notifies the handshake inspection circuitry 313 to skip inspection and the process returns to the process outlined in 700 of FIG. 7. When no alert is received, the example handshake inspection circuitry 313 finishes inspection of the data flow (block 822). In other examples, the modifiable period of time is not utilized, the example ASN reputation request handling circuitry 207 sends an alert to skip inspection or an alert to complete inspection to the example flow controlling circuitry 319.

Figure 9:
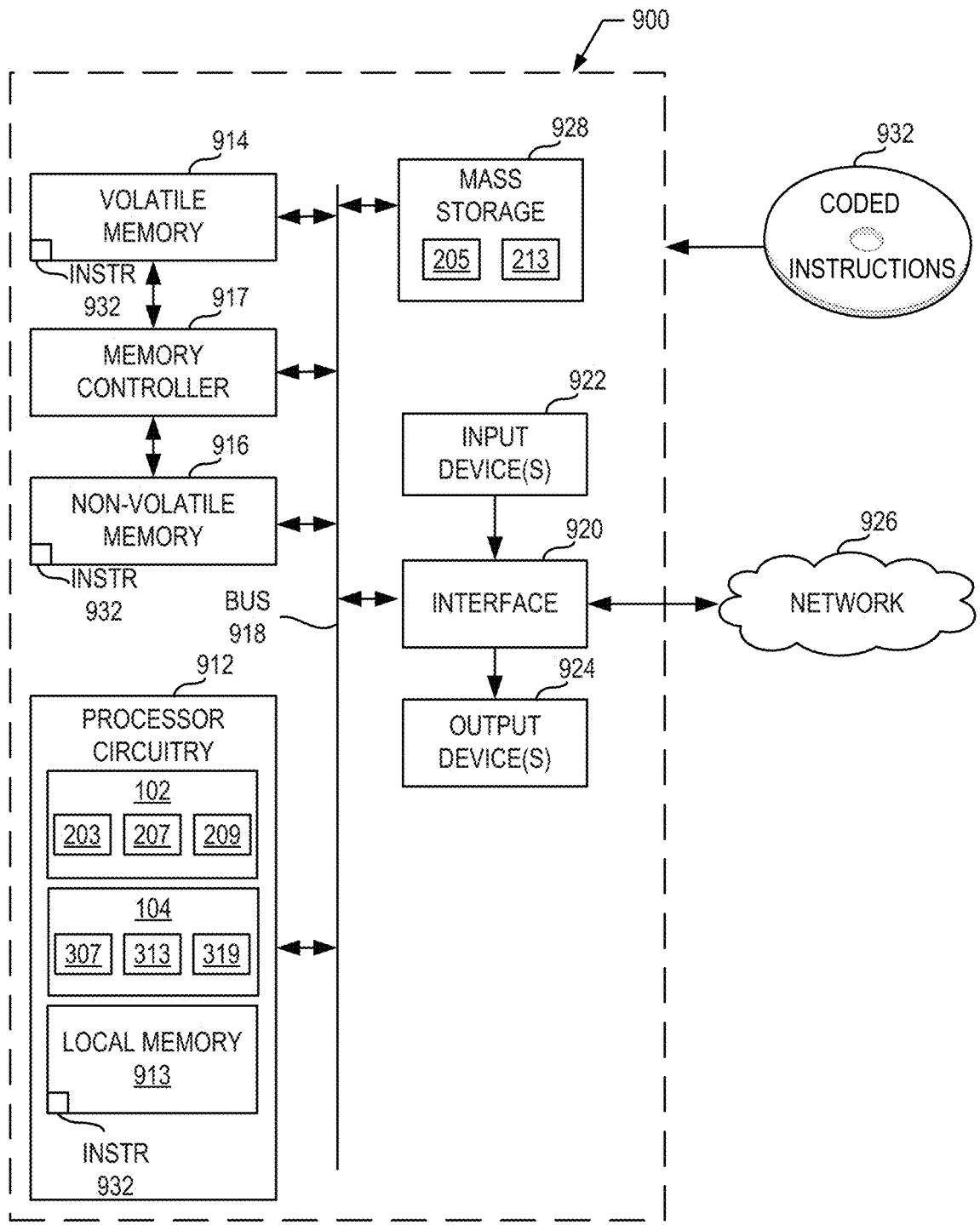
FIG. 9 is a block diagram of an example processing platform including processor circuitry structured to execute the example machine readable instructions of FIGS. 4 through 8 to implement the example ASN reputation managing circuitry and/or the example network traffic monitoring circuitry of FIGS. 1 through 3.

When the inspection is completed the example handshake inspection circuitry 313 determines if the connection is safe and will allow the client devices 110 to connect to the example server 108 (block 824). When the inspection shows the connection is safe, the example flow controlling circuitry 319 will notify the example ASN reputation request handling circuitry 207 of the successful inspection (block 826) which will cause the IP address, domain name, and TTL value to be stored in the example TTL greenlist data store 213 and improve future inspections. When the inspection shows the connection poses a security threat, the example flow controller circuitry 319 redirects the example client devices 110 away from the domain (e.g., direct to a block page) (block 828). FIG. 9 is a block diagram of an example processor platform 900 structured to execute and/or instantiate the machine readable instructions and/or operations of FIGS. 4-8 to implement the apparatus of FIG. 2. The processor platform 900 can be, for example, a server, a personal computer, a workstation, a self-learning machine (e.g., a neural network), an Internet appliance, a gaming console, a set top box, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example ASN greenlist generation circuitry 203, the example ASN reputation request circuitry 207, the example handshake parameter receiver circuitry 209, and/or more generally the example ASN reputation managing circuitry 102 as well as the example handshake parameter transmitter circuitry 307, the example handshake inspection circuitry 313, the example flow controlling circuitry 319 and/or more generally the network traffic monitoring circuitry 104.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, a keyboard, a button, a mouse, a touchscreen, a track-pad, a trackball, and/or an isopoint device.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or a tactile output device. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives. In this example, the mass storage 928 implements the example ASN greenlist data store 205 and the example TTL greenlist data store 213.

The machine executable instructions 932, which may be implemented by the machine readable instructions of FIGS. 4-8, may be stored in the mass storage device 928, in the volatile memory 914, in the non-volatile memory 916, and/or on a removable non-transitory computer readable storage medium such as a CD or DVD.

Figure 10:
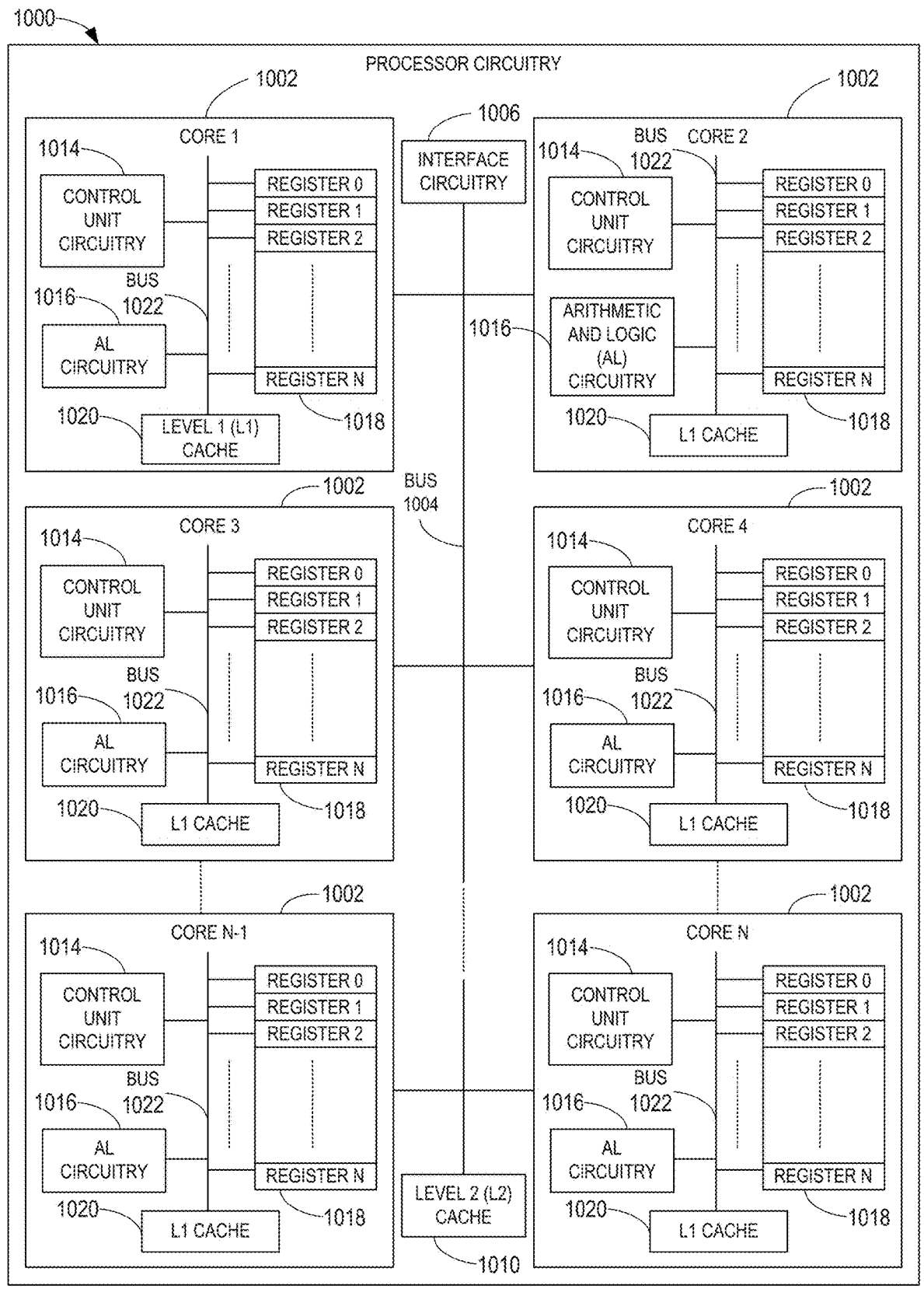
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 4 through 8.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1020 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general puspose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
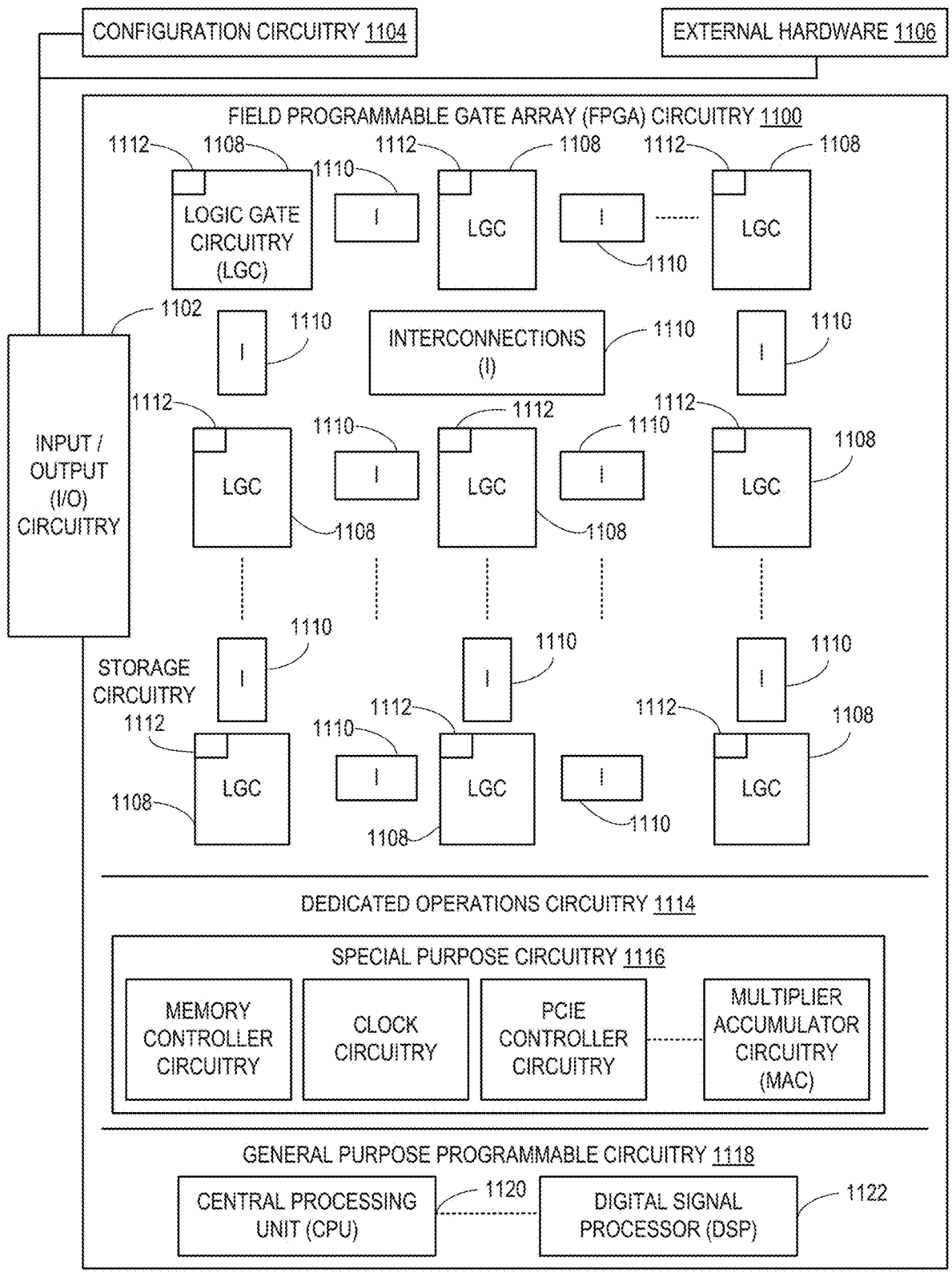
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 4 through 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 4 through 8. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIG. 4 through 8. As such, the FPGA circuitry 1100 may be structured to effectively instantiate some or all of the machine readable instructions of the flowcharts of FIGS. 4 through 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 4 through 8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 4 through 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 4 through 8 may be executed by one or more of the cores 1002 of FIG. 10 and a second portion of the machine readable instructions represented by the flowcharts of FIGS. 4 through 8 may be executed by the FPGA circuitry 1100 of FIG. 11.

In some examples, the processor circuitry 912 of FIG. 9 may be in one or more packages. For example, the processor circuitry 1000 of FIG. 10 and/or the FPGA circuitry 1000 of FIG. 10 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
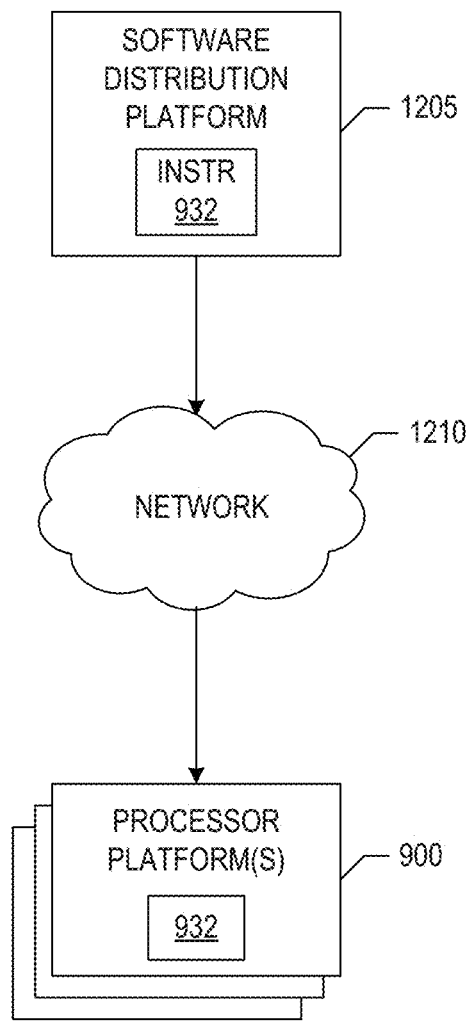
FIG. 12 is a block diagram of an example software distribution platform (e.g., one or more servers) to distribute software (e.g., software corresponding to the example machine readable instructions of FIGS. 4 through 8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 402-826 of FIGS. 4-8, as described above. The one or more servers of the example software distribution platform 1205 are in communication with a network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 400 of FIGS. 4 through 8, may be downloaded to the example processor platform 900, which is to execute the machine readable instructions 932 to implement the example ASN reputation managing circuitry 102. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that improve the inspection of data flows on a network. The disclosed systems, methods, apparatus, and articles of manufacture improve the efficiency of using a computing device by skipping the inspection of a network data flow based on the reputation of an ASN associated with the destination of the data flow. The disclosed systems, methods, apparatus, and articles of manufacture include ASN reputation managing circuitry to designate the statuses of ASNs as malicious, non-malicious, or unknown and group ASNs with non-malicious statuses together into a list for a geographic location. The ASN reputation managing circuitry further includes calculating sharing ratios for IP addresses which can be used to skip tunneling of data flows in implementations using VPNs. Disclosed systems, methods, apparatus, and articles of manufacture also include network traffic monitoring circuitry that communicates with the ASN reputation managing circuitry to determine when inspection and tunneling can be skipped for a data flow. In such disclosed systems, methods, apparatus, and articles of manufacture, the skipping inspection on data flows as well as skipping tunneling when using a VPN utilizes less computing power and computer resources on network middleboxes. The disclosed systems, methods, apparatus, and articles of manufacture solve the computing issue previously requiring expensive processing resources to perform safe, secure network communications. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to reduce computation corresponding to inspection of non-malicious data flows are disclosed herein. Further examples and combinations thereof include the following:

Example 1 includes an apparatus to improve inspection of network data flows, the apparatus comprising memory, and processor circuitry to execute machine readable instructions to at least identify network domains accessible by at least one client device in a geographic location of interest, associate the identified network domains with Autonomous System Numbers (ASNs), create a list of respective ones of the ASNs that include a non-malicious status corresponding to Internet protocol (IP) addresses associated with respective ones of the identified network domains, and in response to receiving a reputation request corresponding to a destination IP address, cause inspection of a data flow to be skipped when the destination IP address is associated with the list of non-malicious ASNs.

Example 2 includes the apparatus as defined in example 1, wherein the processor circuitry is to designate the ASNs with a status based on at least one of reputation or category information.

Example 3 includes the apparatus as defined in example 2, wherein the processor circuitry is to assign the status to respective ones of the ASNs as at least one of malicious, non-malicious or unknown.

Example 4 includes the apparatus as defined in example 1, wherein the processor circuitry is to calculate a sharing ratio of the destination IP address.

Example 5 includes the apparatus as defined in example 4, wherein the processor circuitry is to cause a network connection to be tunneled based on a threshold value of the sharing ratio.

Example 6 includes the apparatus as defined in example 4, wherein the processor circuitry is to cause a virtual private network (VPN) tunnel to route the destination IP address when the sharing ratio satisfies a threshold value.

Example 7 includes the apparatus as defined in example 4, wherein the processor circuitry is to bypass network tunneling when the sharing ratio does not satisfy a threshold value.

Example 8 includes the apparatus as defined in example 1, wherein the processor circuitry is to retrieve handshake parameters corresponding to a first and second device associated with the destination IP address.

Example 9 includes the apparatus as defined in example 8, wherein the processor circuitry is to compare the retrieved handshake parameters to handshake parameters of a greenlist, and cause inspection of the data flow when the retrieved handshake parameters do not match the handshake parameters of the greenlist.

Example 10 includes an apparatus comprising greenlist generation circuitry to identify network domains accessible by at least one client device in a geographic location of interest, associate the identified network domains with Autonomous System Numbers (ASNs), and create a list of respective ones of the ASNs that include a non-malicious status corresponding to Internet protocol (IP) addresses associated with respective ones of the identified network domains, and network traffic monitoring circuitry to, in response to receiving a reputation request corresponding to a destination IP address, cause inspection of a data flow to be skipped when the destination IP address is associated with the list of non-malicious ASNs.

Example 11 includes the apparatus as defined in example 10, wherein the greenlist generation circuitry is to designate the ASNs with a status based on at least one of reputation information or category information.

Example 12 includes the apparatus as defined in example 11, wherein the greenlist generation circuitry is to assign the status to respective ones of the ASNs as at least one of malicious, non-malicious or unknown.

Example 13 includes the apparatus as defined in example 10, wherein the greenlist generation circuitry is to calculate a sharing ratio of the destination IP address.

Example 14 includes the apparatus as defined in example 13, further including ASN reputation request handling circuitry to cause a network connection to be tunneled based on a threshold value of the sharing ratio.

Example 15 includes the apparatus as defined in example 13, further including flow controlling circuitry to cause a virtual private network (VPN) tunnel to route the destination IP address when the sharing ratio satisfied a threshold value.

Example 16 includes the apparatus as defined in example 13, further including flow controlling circuitry to bypass network tunneling when the sharing ratio does not satisfy a threshold value.

Example 17 includes the apparatus as defined in example 10, further including handshake parameter receiver circuitry to retrieve handshake parameters corresponding to a first and second device associated with the destination IP address.

Example 18 includes the apparatus as defined in example 17, further including handshake inspection circuitry to compare the retrieved handshake parameters to handshake parameters corresponding to a greenlist, and cause inspection of the data flow when the retrieved handshake parameters do not match the handshake parameters of the greenlist.

Example 19 includes a non-transitory computer readable medium comprising instructions that, when executed, cause at least one processor to at least identify network domains accessible by at least one client device in a geographic location of interest, associate the identified network domains with Autonomous System Numbers (ASNs), create a list of respective ones of the ASNs that include a non-malicious status corresponding to Internet protocol (IP) addresses associated with respective ones of the identified network domains, and in response to receiving a reputation request corresponding to a destination IP address, cause inspection of a data flow to be skipped when the destination IP address is associated with the list of non-malicious ASNs.

Example 20 includes the non-transitory computer readable medium as defined in example 19, wherein the instructions, when executed, cause the at least one processor to designate the ASNs with a status based on at least one of reputation or category information.

Example 21 includes the non-transitory computer readable medium as defined in example 20, wherein the instructions, when executed, cause the at least one processor to assign the status to respective ones of the ASNs as at least one of malicious, non-malicious or unknown.

Example 22 includes the non-transitory computer readable medium as defined in example 19, wherein the instructions, when executed, cause the at least one processor to calculate a sharing ratio of the destination IP address.

Example 23 includes the non-transitory computer readable medium as defined in example 22, wherein the instructions, when executed, cause the at least one processor to cause a network connection to be tunneled based on a threshold value of the sharing ratio.

Example 24 includes the non-transitory computer readable medium as defined in example 22, wherein the instructions, when executed, cause the at least one processor to cause a virtual private network (VPN) tunnel to route the destination IP address when the sharing ratio satisfies a threshold value.

Example 25 includes the non-transitory computer readable medium as defined in example 22, wherein the instructions, when executed, cause the at least one processor to bypass network tunneling when the sharing ratio does not satisfy a threshold value.

Example 26 includes the non-transitory computer readable medium as defined in example 19, wherein the instructions, when executed, cause the at least one processor to retrieve handshake parameters corresponding to a first and second device associated with the destination IP address.

Example 27 includes the non-transitory computer readable medium as defined in example 26, wherein the instructions, when executed, cause the at least one processor to compare the retrieved handshake parameters to handshake parameters of a greenlist, and cause inspection of the data flow when the retrieved handshake parameters do not match the handshake parameters of the greenlist.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to inspect network data flows, the apparatus comprising:
    interface circuitry;
    machine readable instructions; and
    at least one processor circuit to be programmed by the machine readable instructions to:
        create a first list of first ones of a plurality of Autonomous System Numbers (ASNs) that include a non-malicious status, and a second list of second ones of the plurality of the ASNs that include an unknown status;
        determine a first ASN of the plurality of ASNs associated with a destination Internet Protocol (IP) address based on a first reputation request from a first client device;
        determine a reputation of the destination IP address based on the first ASN, the reputation corresponding to one of the first list or the second list;
        cause a first inspection of a first data flow to occur for the first client device when the destination IP address is associated with the second list that includes the unknown status;
        cause a second inspection of a second data flow to occur based on a result of the first inspection when a second reputation request is received from a second client device, the second reputation request directed to the destination IP address; and
        after a determination that the second data flow is malicious, redirect the second client device to a block page to prevent connection to a malicious domain.

2. The apparatus as defined in claim 1, wherein one or more of the at least one processor circuit is to designate the plurality of the ASNs with at least one of the non-malicious status or the unknown status based on at least one of reputation or category information.

3. The apparatus as defined in claim 1, wherein one or more of the at least one processor circuit is to calculate a sharing ratio of the destination IP address.

4. The apparatus as defined in claim 3, wherein one or more of the at least one processor circuit is to cause a network connection to be tunneled based on a threshold value of the sharing ratio.

5. The apparatus as defined in claim 3, wherein one or more of the at least one processor circuit is to cause a virtual private network (VPN) tunnel to route the destination IP address when the sharing ratio satisfies a threshold value.

6. The apparatus as defined in claim 3, wherein one or more of the at least one processor circuit is to bypass network tunneling when the sharing ratio does not satisfy a threshold value.

7. The apparatus as defined in claim 1, wherein one or more of the at least one processor circuit is to retrieve handshake parameters corresponding to the first client device and the second client device associated with the destination IP address.

8. The apparatus as defined in claim 7, wherein one or more of the at least one processor circuit is to:
compare the retrieved handshake parameters to handshake parameters of a greenlist; and
cause the second inspection of the second data flow when the retrieved handshake parameters do not match the handshake parameters of the greenlist.

9. The apparatus as defined in claim 1, wherein one or more of the at least one processor circuit is to:
determine the reputation of the destination IP address at a first time;
determine an updated reputation of the destination IP address at a second time; and
determine to skip a third inspection of a third data flow based on the updated reputation, the skip of the third inspection to occur in response to a third reputation request, the third reputation request directed to the destination IP address.

10. The apparatus as defined in claim 1, wherein the reputation of the destination IP address represents a level of security threat risk based on a leniency of a policy associated with the destination IP address.

11. An apparatus comprising:
greenlist generation circuitry to:
create a first list of first ones of a plurality of Autonomous System Numbers (ASNs) that include a non-malicious status, and a second list of second ones of the plurality of the ASNs that include an unknown status;
network traffic monitoring circuitry to;
determine a first ASN of the plurality of ASNs associated with a destination Internet Protocol (IP) address based on a first reputation request from a first client device;
determine a reputation of the destination IP address based on the first ASN, the reputation corresponding to one of the first list or the second list;
cause a first inspection of a first data flow to occur for the first client device when the destination IP address is associated with the second list that includes the unknown status;
cause a second inspection of a second data flow to occur based on a result of the first inspection when a second reputation request is received from a second client device, the second reputation request directed to the destination IP address; and
after a determination that the second data flow is malicious, redirect the second client device to a block page to prevent connection to a malicious domain.

12. The apparatus as defined in claim 11, wherein the greenlist generation circuitry is to designate the plurality of the ASNs with at least one of the non-malicious status or the unknown status based on at least one of reputation information or category information.

13. The apparatus as defined in claim 11, wherein the greenlist generation circuitry is to calculate a sharing ratio of the destination IP address.

14. The apparatus as defined in claim 13, further including ASN reputation request handling circuitry to cause a network connection to be tunneled based on a threshold value of the sharing ratio.

15. The apparatus as defined in claim 13, further including flow controlling circuitry to cause a virtual private network (VPN) tunnel to route the destination IP address when the sharing ratio satisfied a threshold value.

16. The apparatus as defined in claim 13, further including flow controlling circuitry to bypass network tunneling when the sharing ratio does not satisfy a threshold value.

17. The apparatus as defined in claim 11, further including handshake parameter receiver circuitry to retrieve handshake parameters corresponding to the first client device and the second client device associated with the destination IP address.

18. The apparatus as defined in claim 17, further including handshake inspection circuitry to:
compare the retrieved handshake parameters to handshake parameters corresponding to a greenlist; and
cause the second inspection of the second data flow when the retrieved handshake parameters do not match the handshake parameters of the greenlist.

19. At least one non-transitory machine readable medium comprising instructions to cause at least one processor circuit to at least:
create a first list of first ones of a plurality of Autonomous System Numbers (ASNs) that include a non-malicious status, and a second list of second ones of the plurality of the ASNs that include an unknown status;
determine a first ASN of the plurality of ASNs associated with a destination Internet Protocol (IP) address based on a first reputation request from a first client device;
determine a reputation of the destination IP address based on the first ASN, the reputation corresponding to one of the first list or the second list;
cause a first inspection of a first data flow to occur for the first client device when the destination IP address is associated with the second list that includes the unknown status;
cause a second inspection of a second data flow to occur based on a result of the first inspection when a second reputation request is received from a second client device, the second reputation request directed to the destination IP address; and
after a determination that the second data flow is malicious, redirect the second client device to a block page to prevent connection to a malicious domain.

20. The at least one non-transitory machine readable medium as defined in claim 19, wherein the instructions are to cause one or more of the at least one processor circuit to designate the ASNs with at least one of the non-malicious status or the unknown status based on at least one of reputation or category information.

* * * * *

UNITED STATES PATENT AND TRADEMARK OFFICE
CERTIFICATE OF CORRECTION

| | | |
|---|---|---|
| PATENT NO. | : 12,206,690 B2 | |
| APPLICATION NO. | : 17/482799 | |
| DATED | : January 21, 2025 | |
| INVENTOR(S) | : Konda et al. | |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this
Eighth Day of July, 2025

Coke Morgan Stewart
*Acting Director of the United States Patent and Trademark Office*